Dec. 25, 1951  M. W. GRIGSBY ET AL  2,580,295
PARTIAL PRODUCT MACHINE
Filed June 3, 1947  20 Sheets-Sheet 19
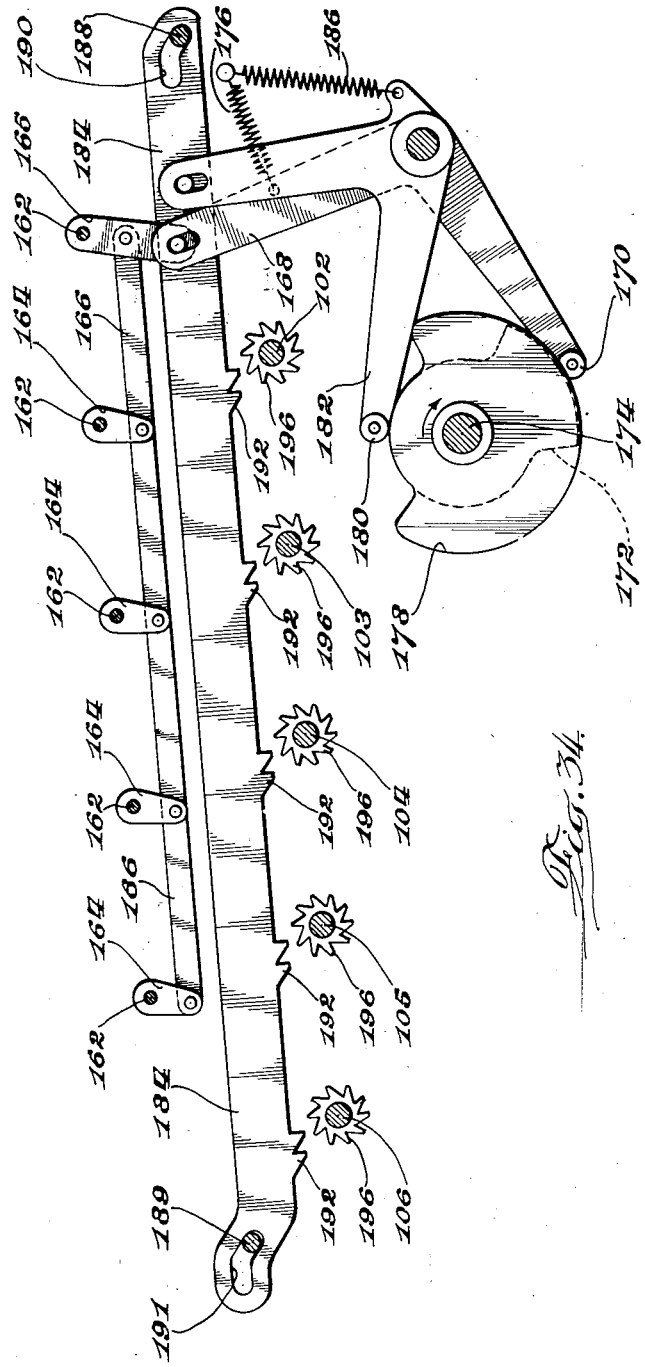
INVENTORS:
Marion W. Grigsby
Thomas O. Mehan
By Hinkle, Horton, Ahlberg, Housmann & Wupper
Attorneys

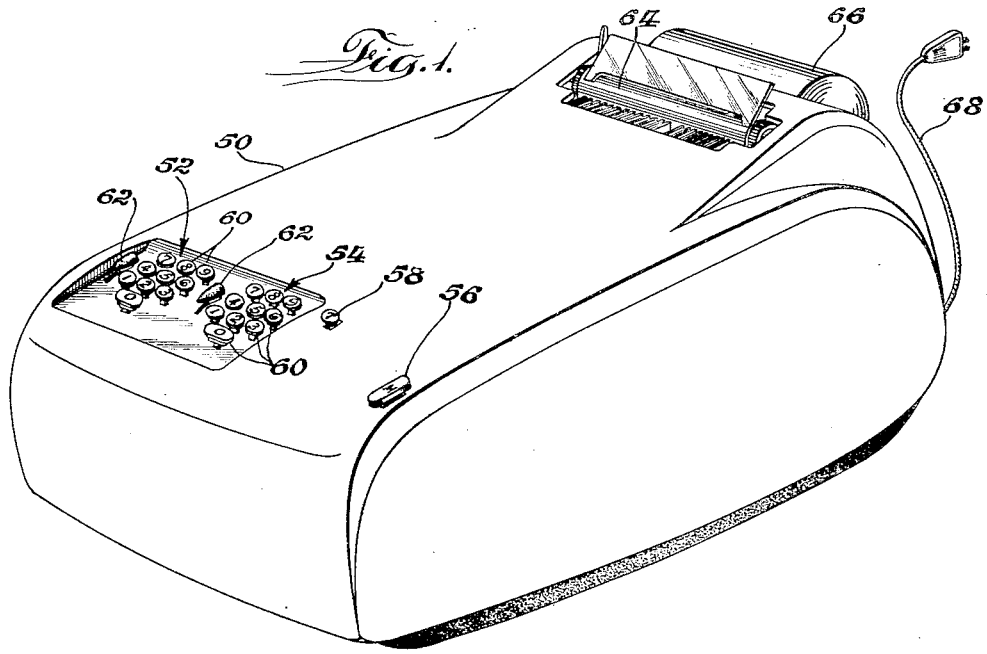

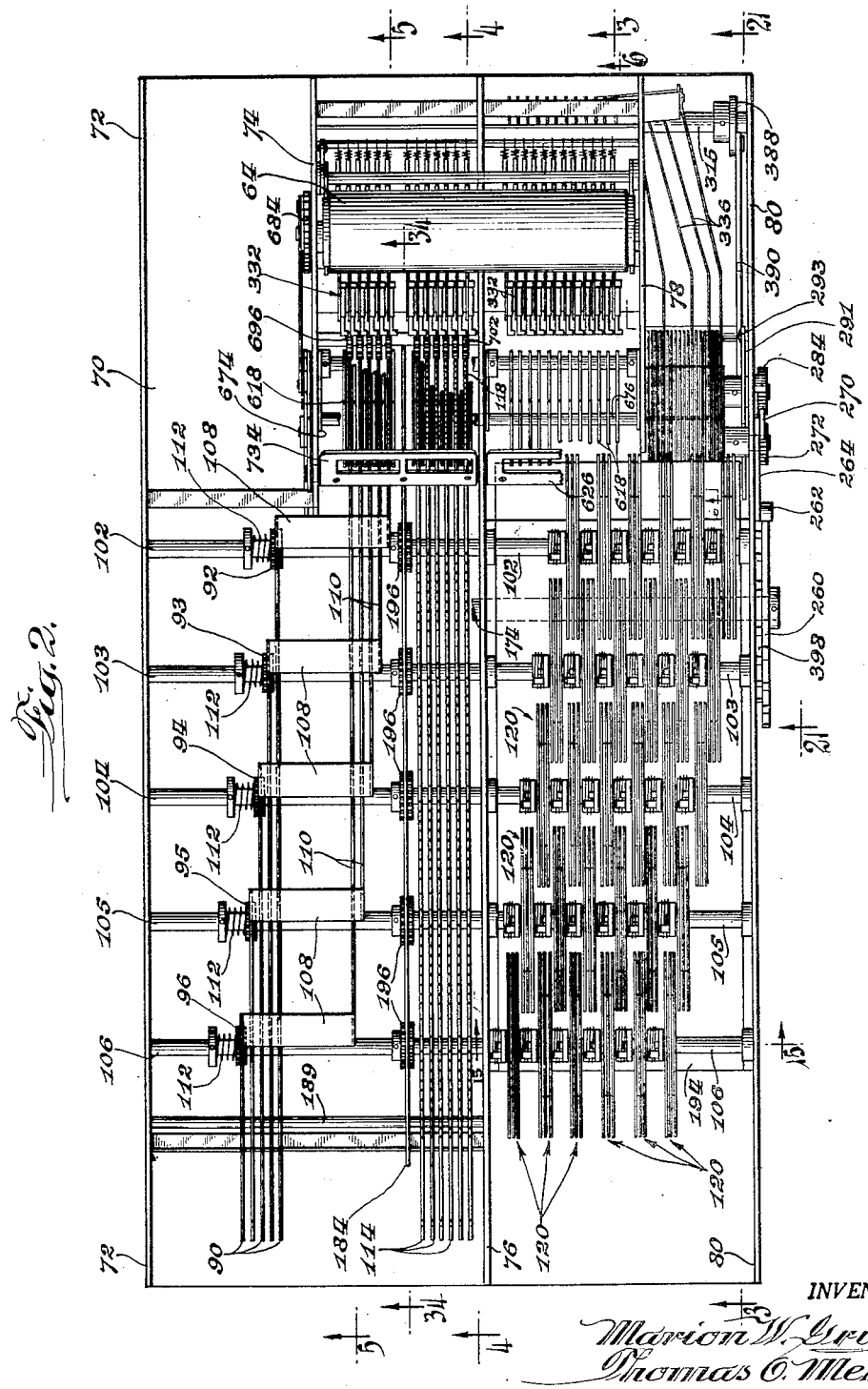

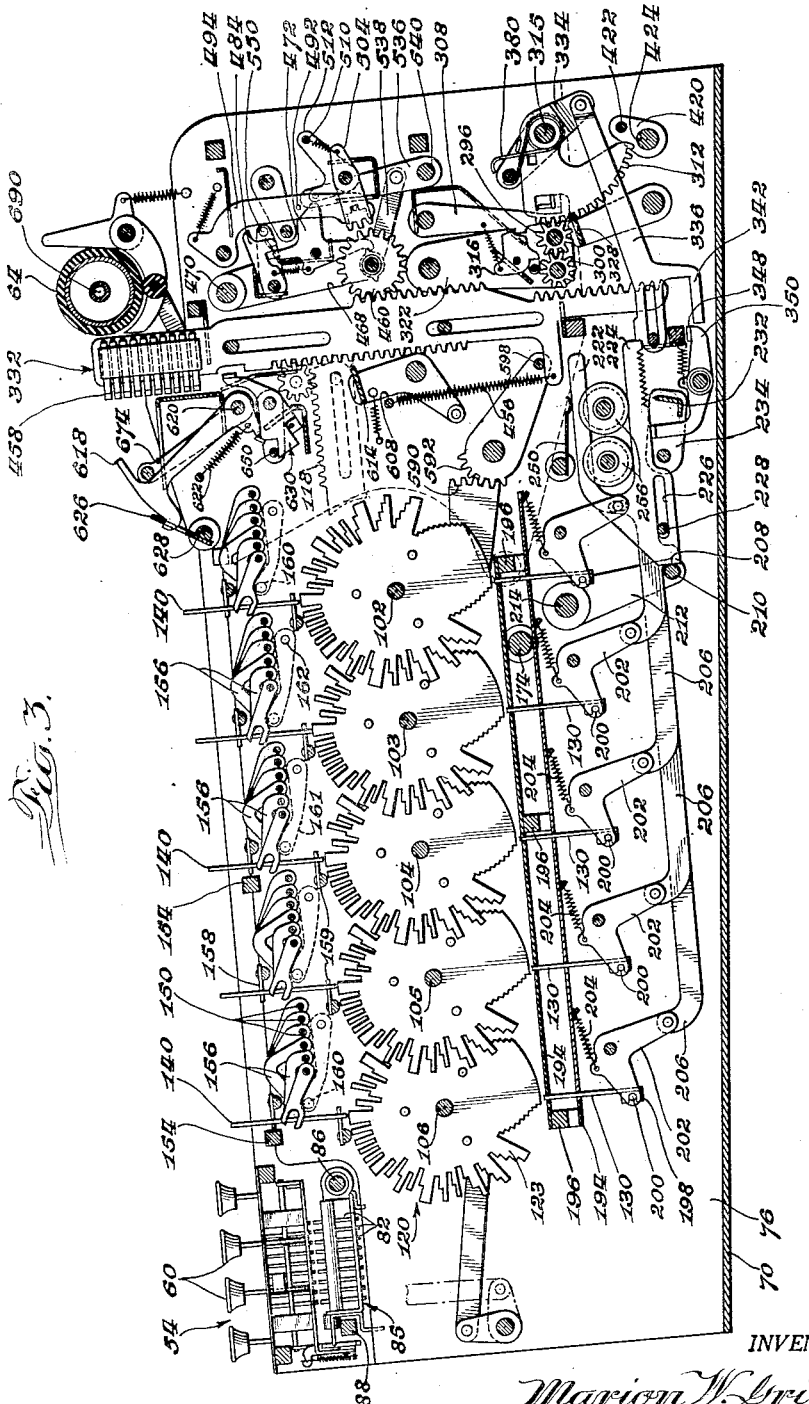

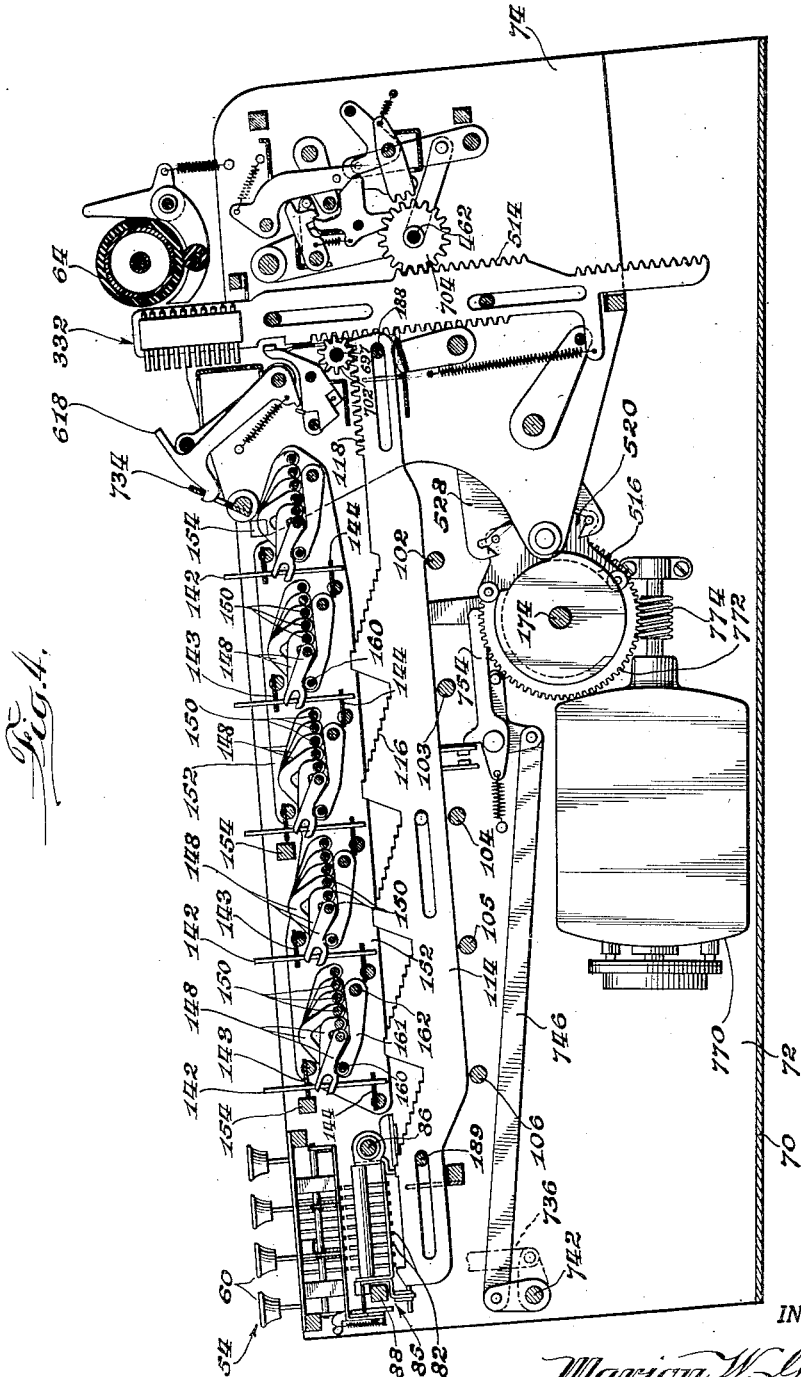

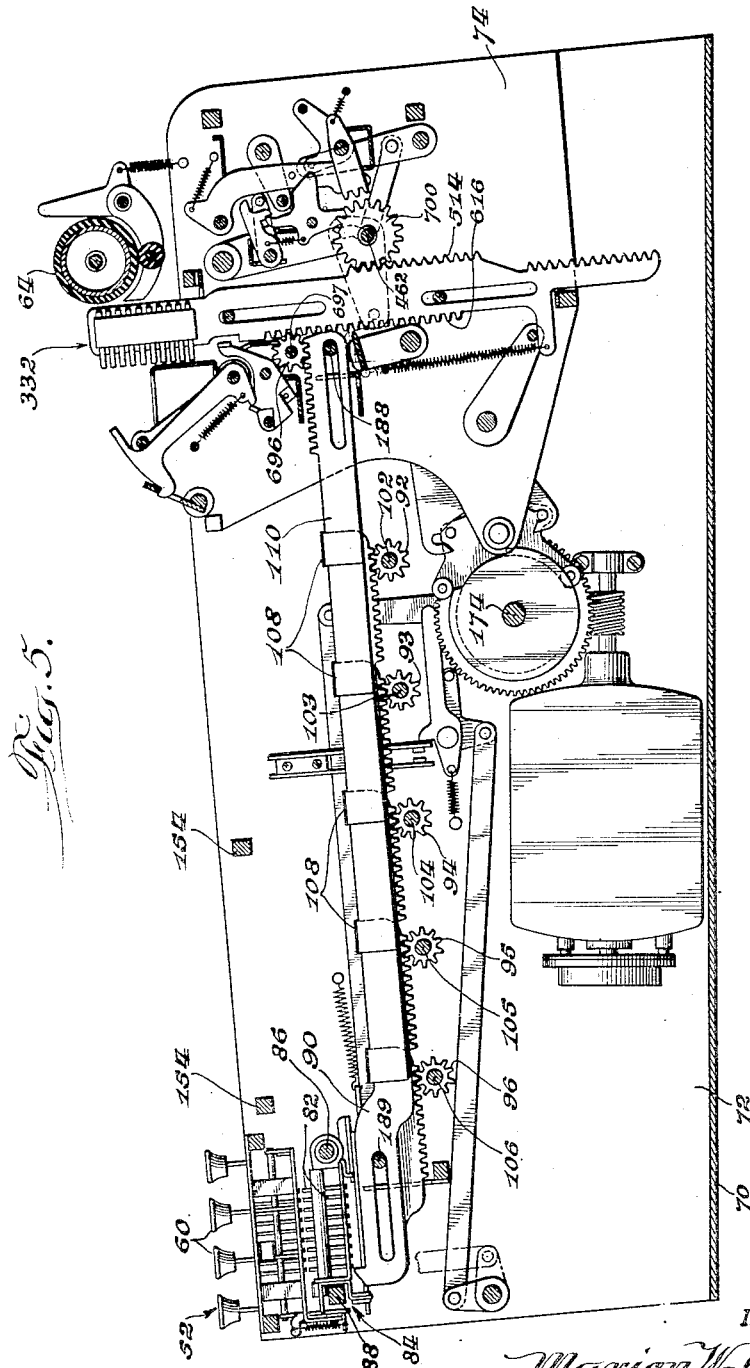

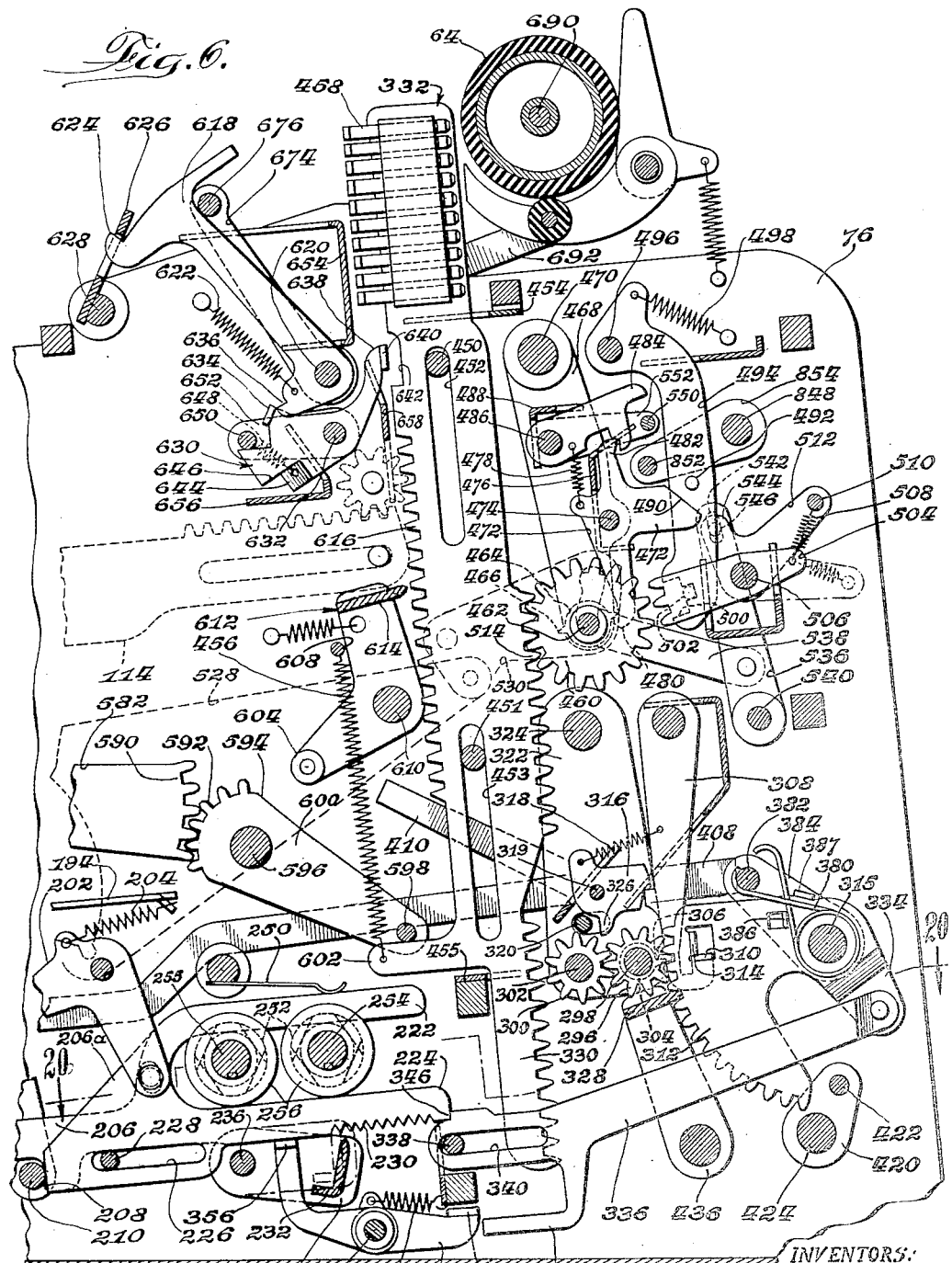

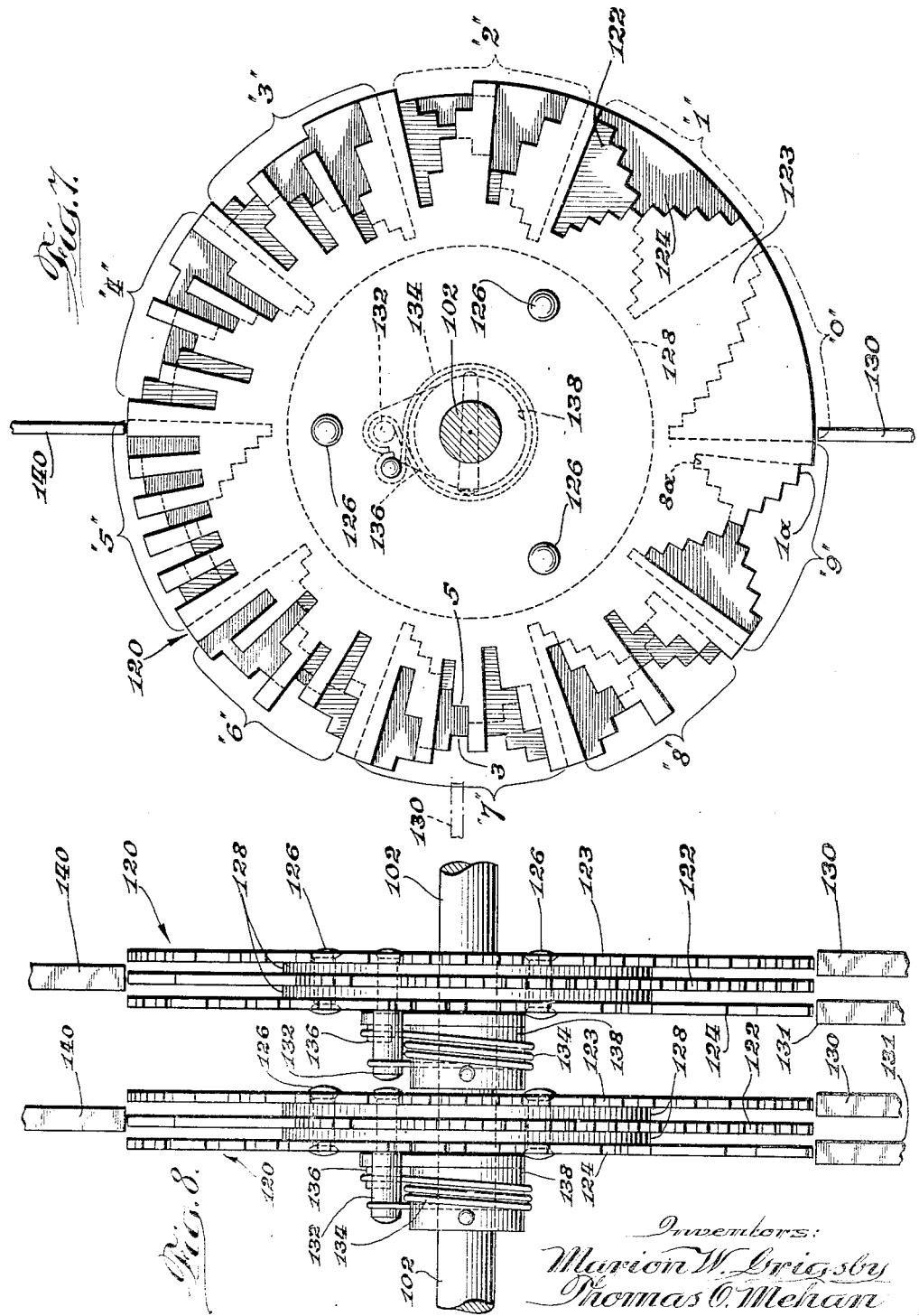

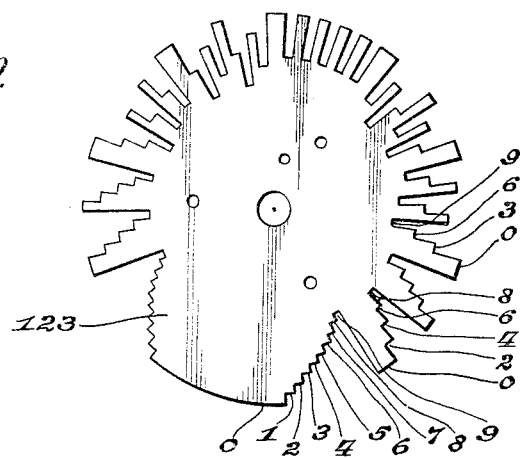
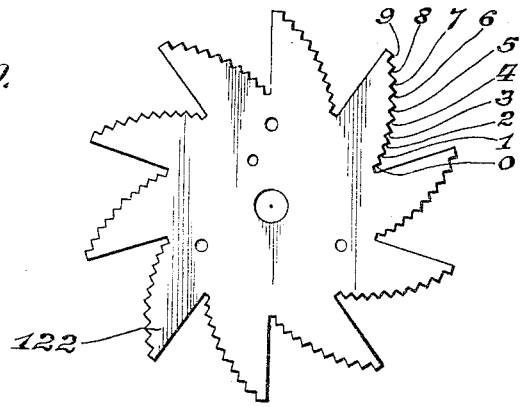
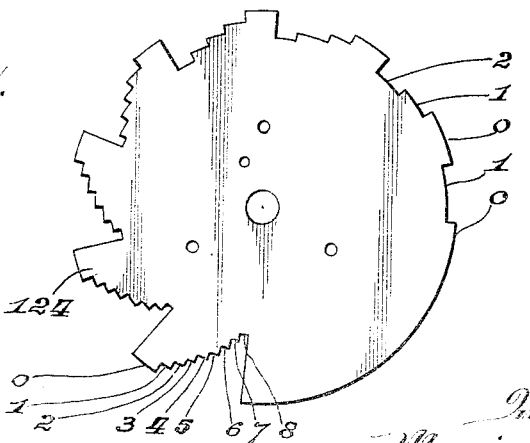

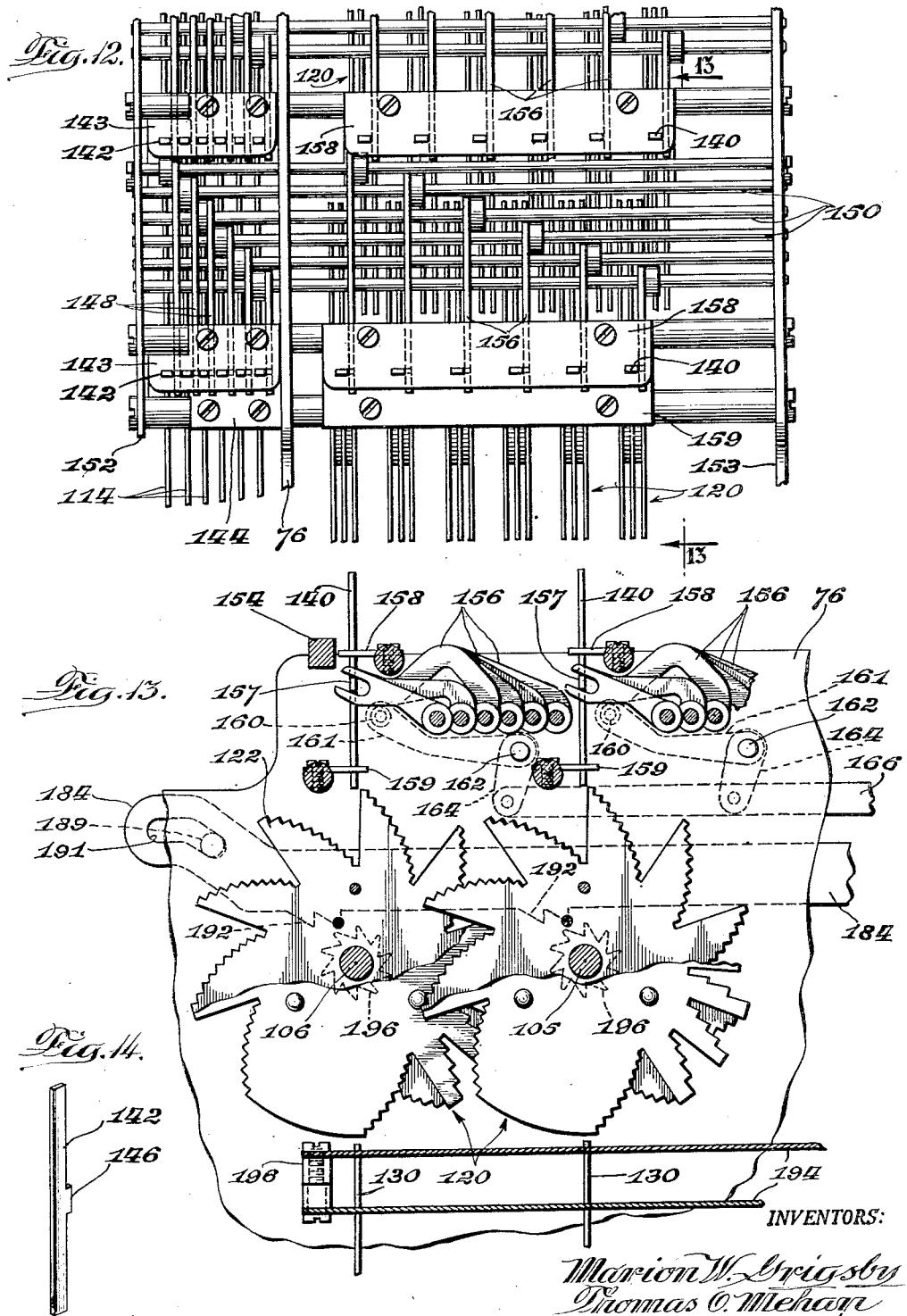

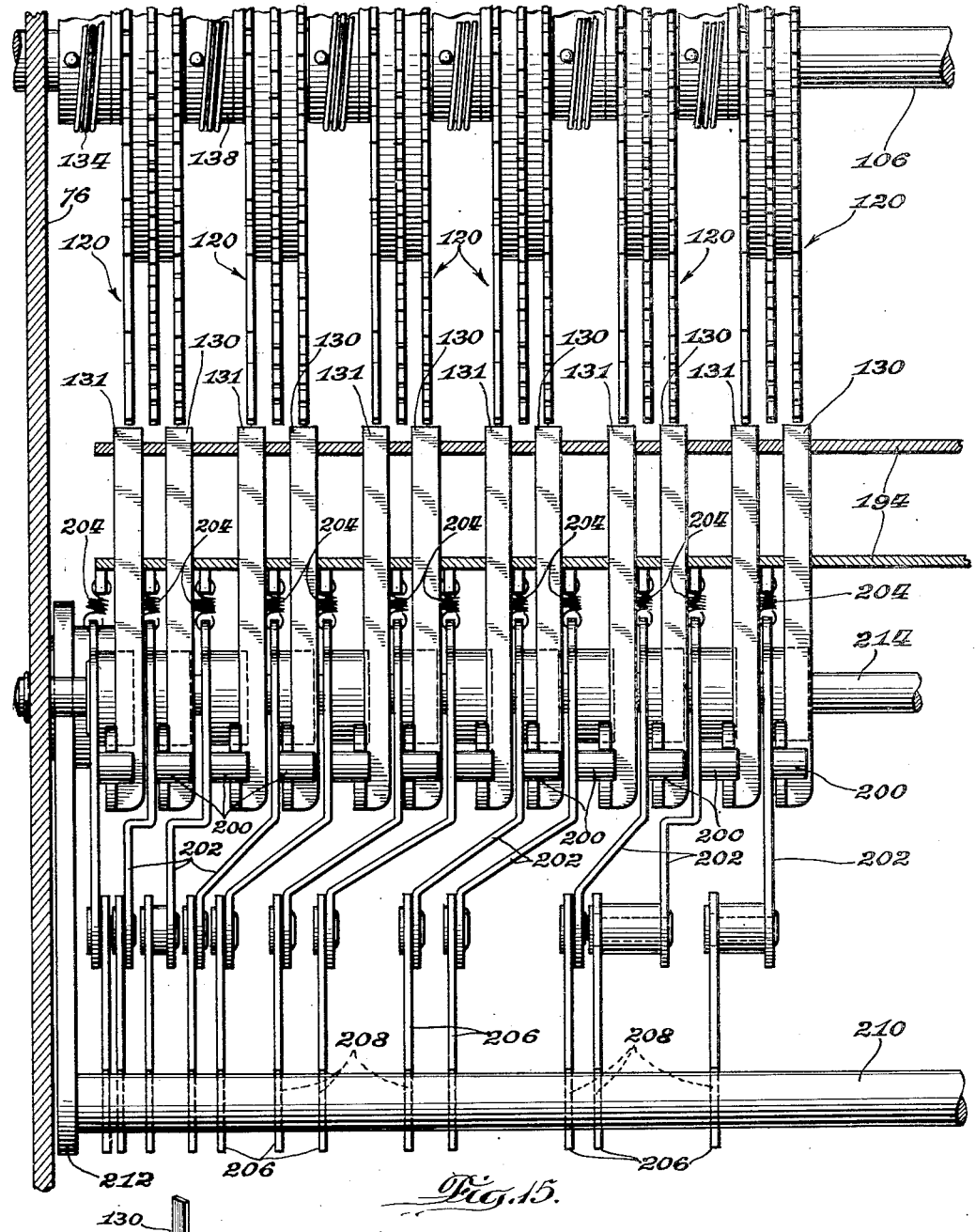

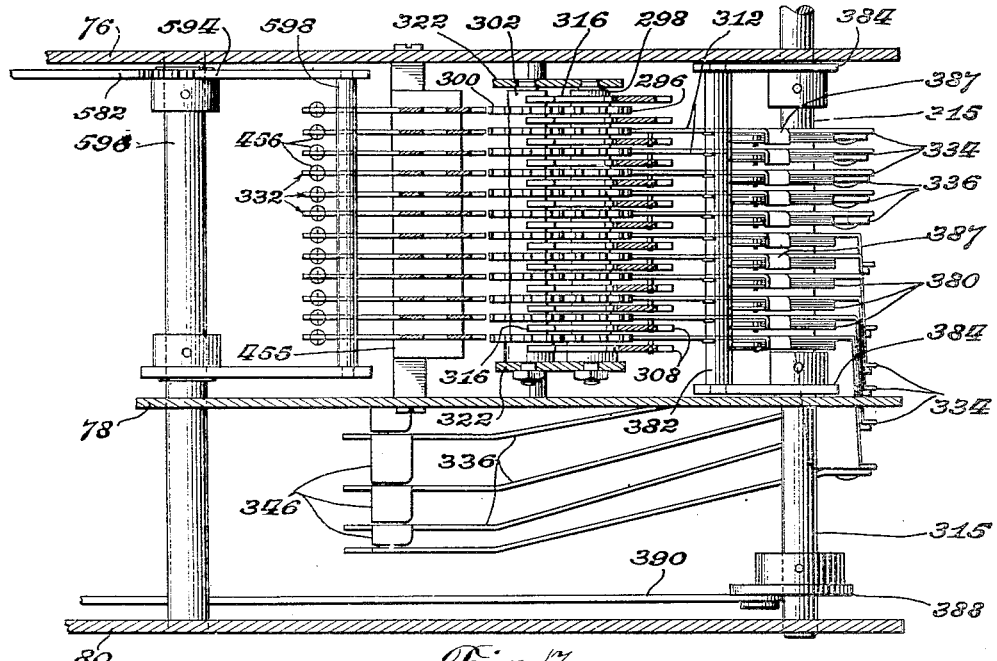
Fig. 17.
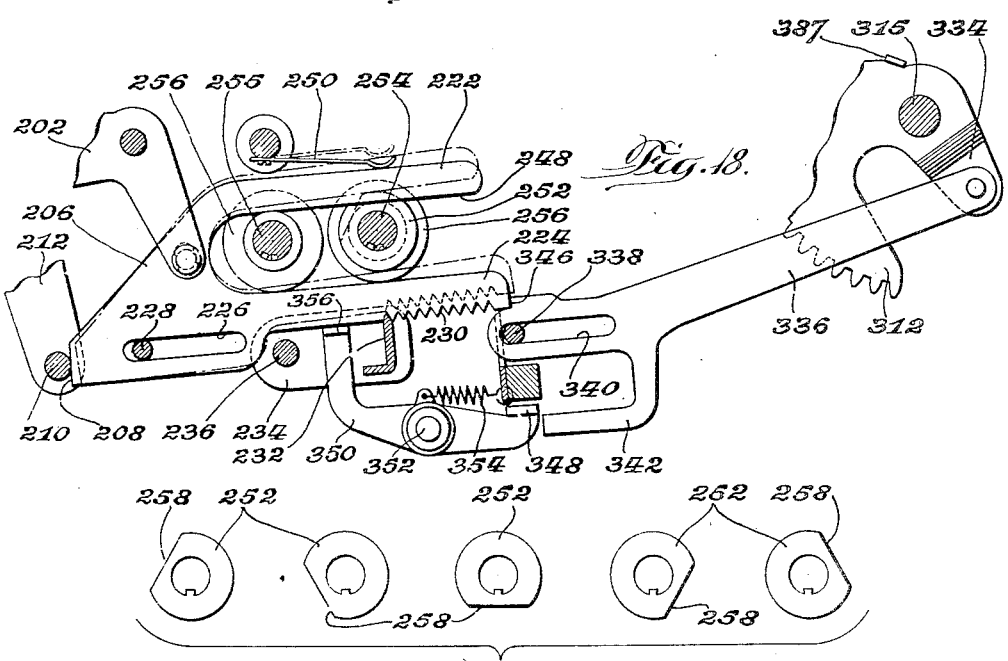
Fig. 18.
Fig. 19.

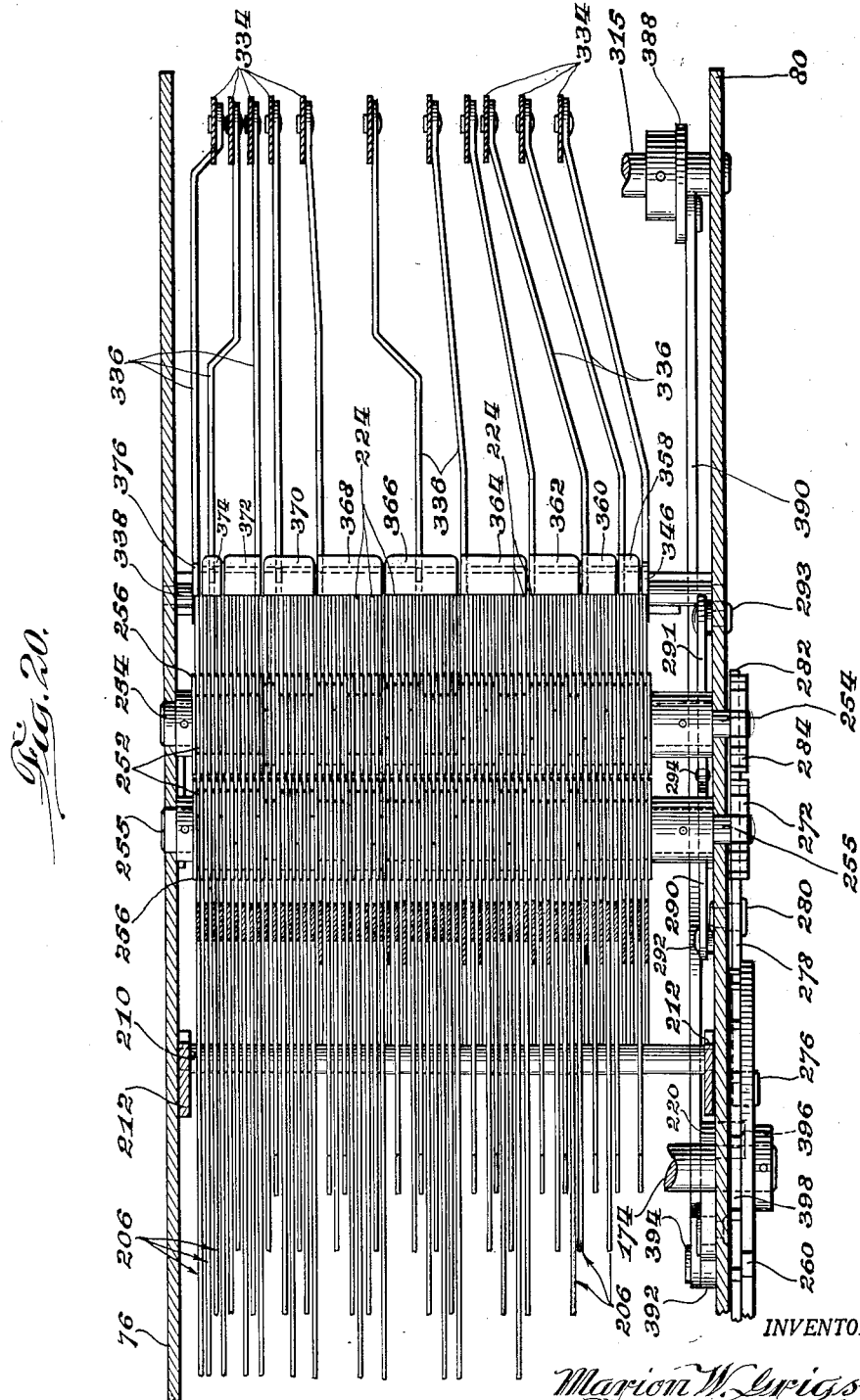

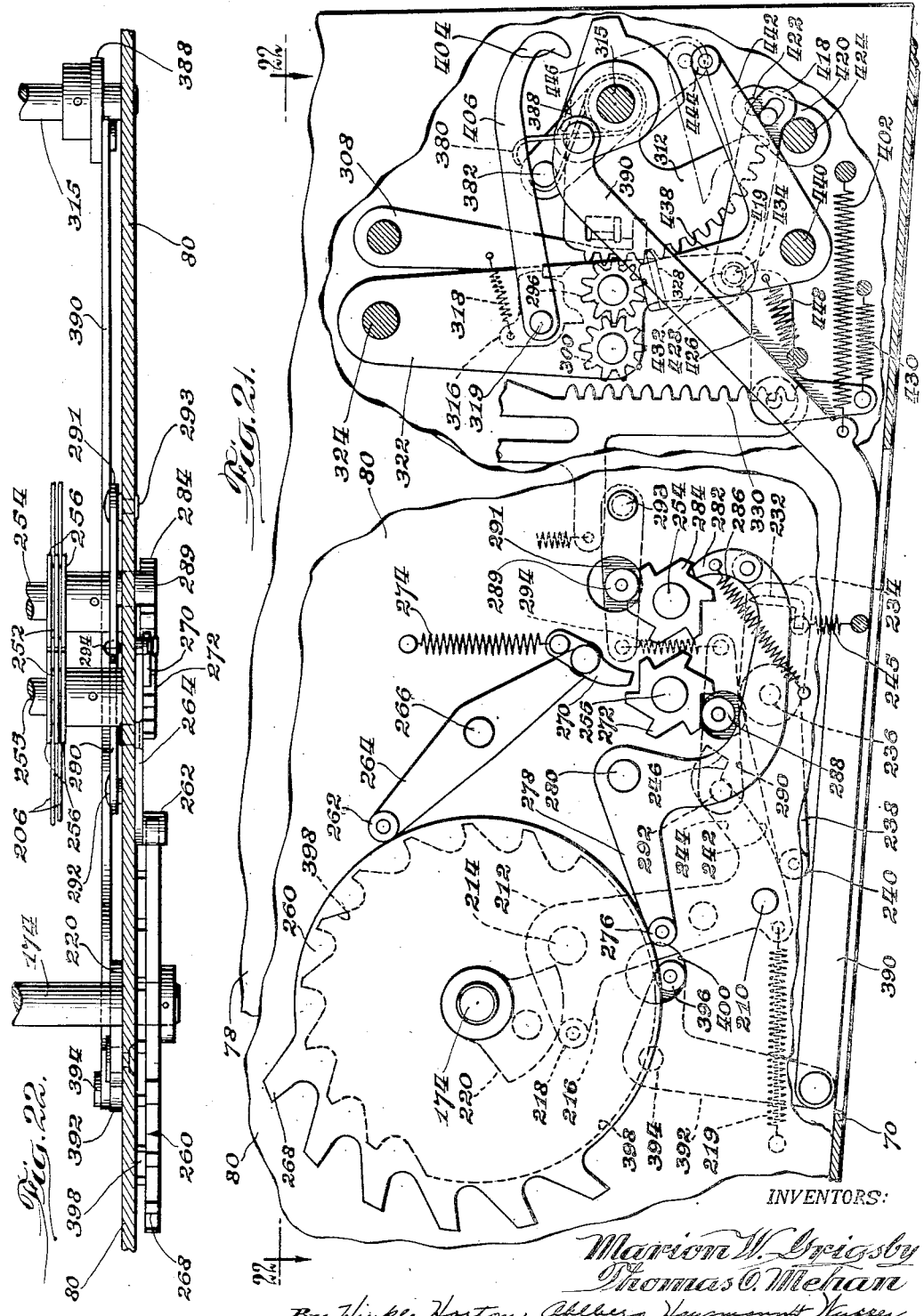

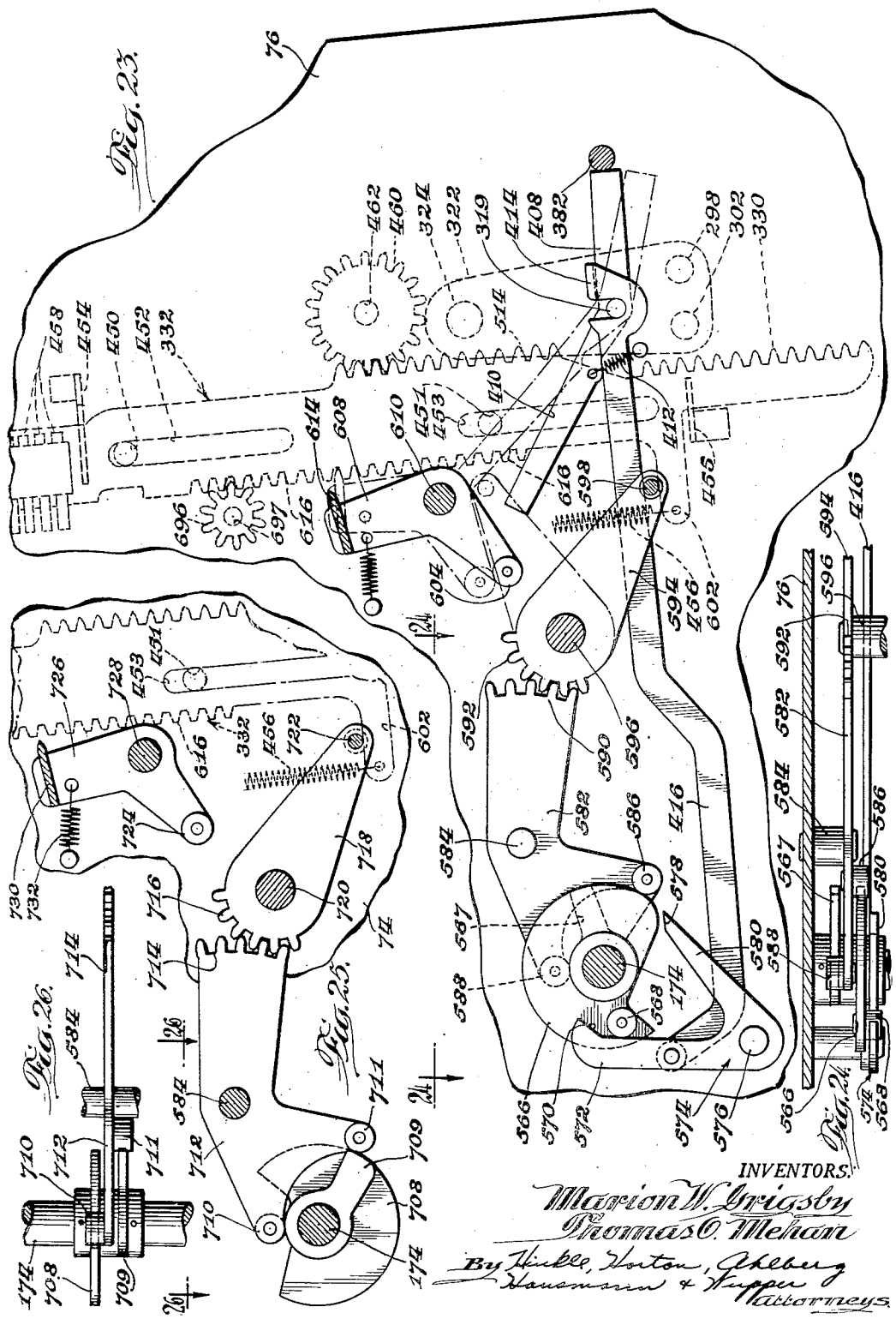

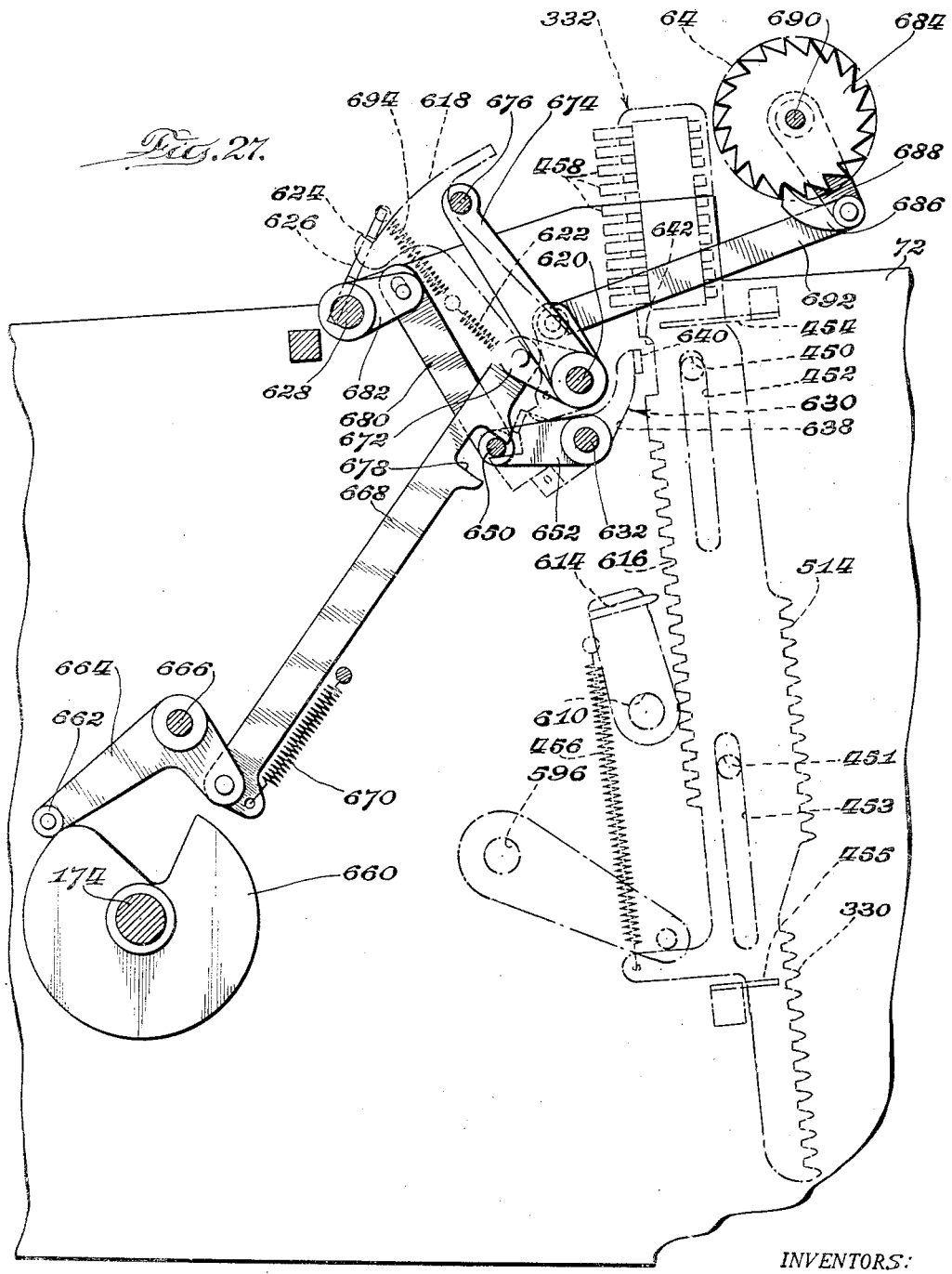

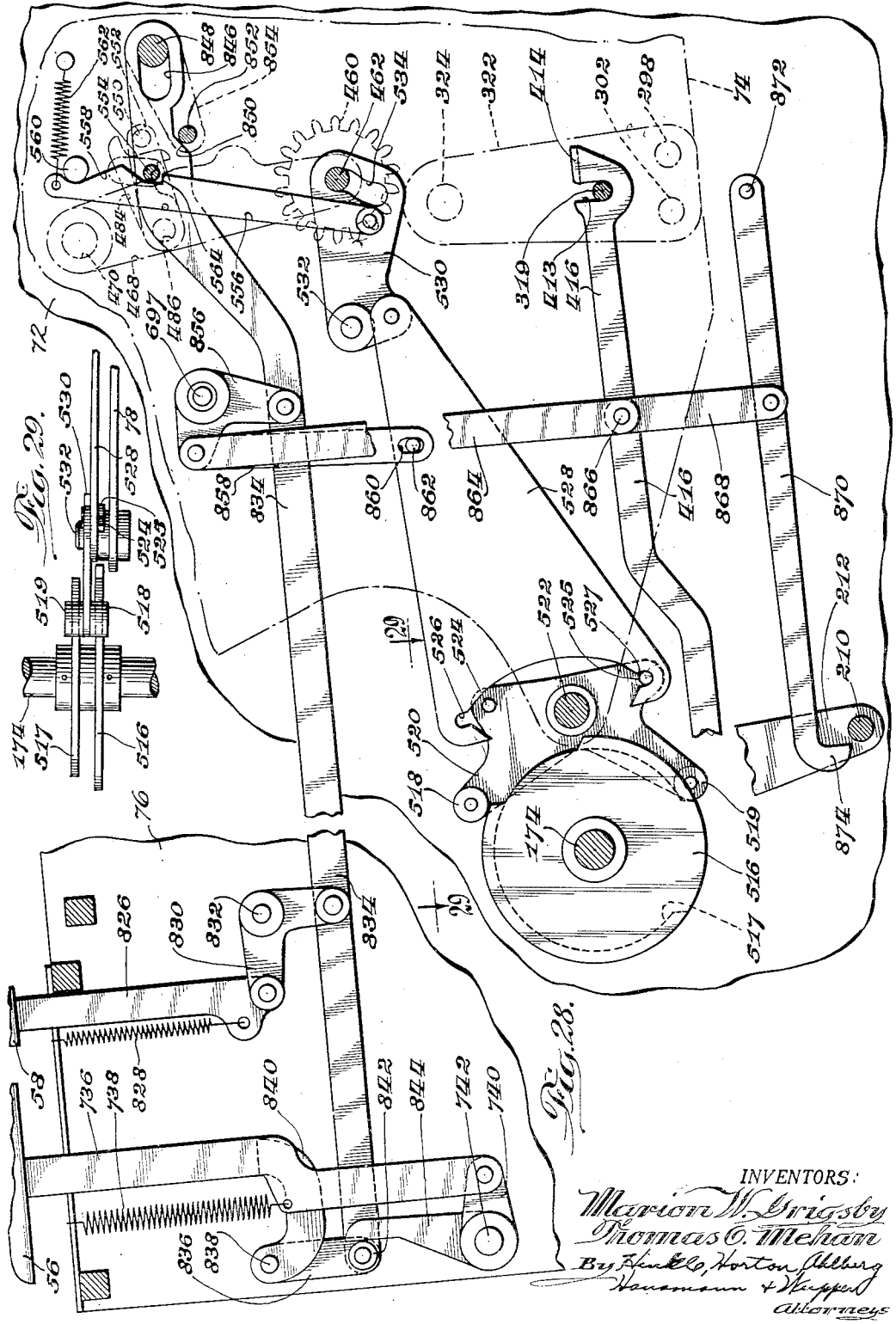

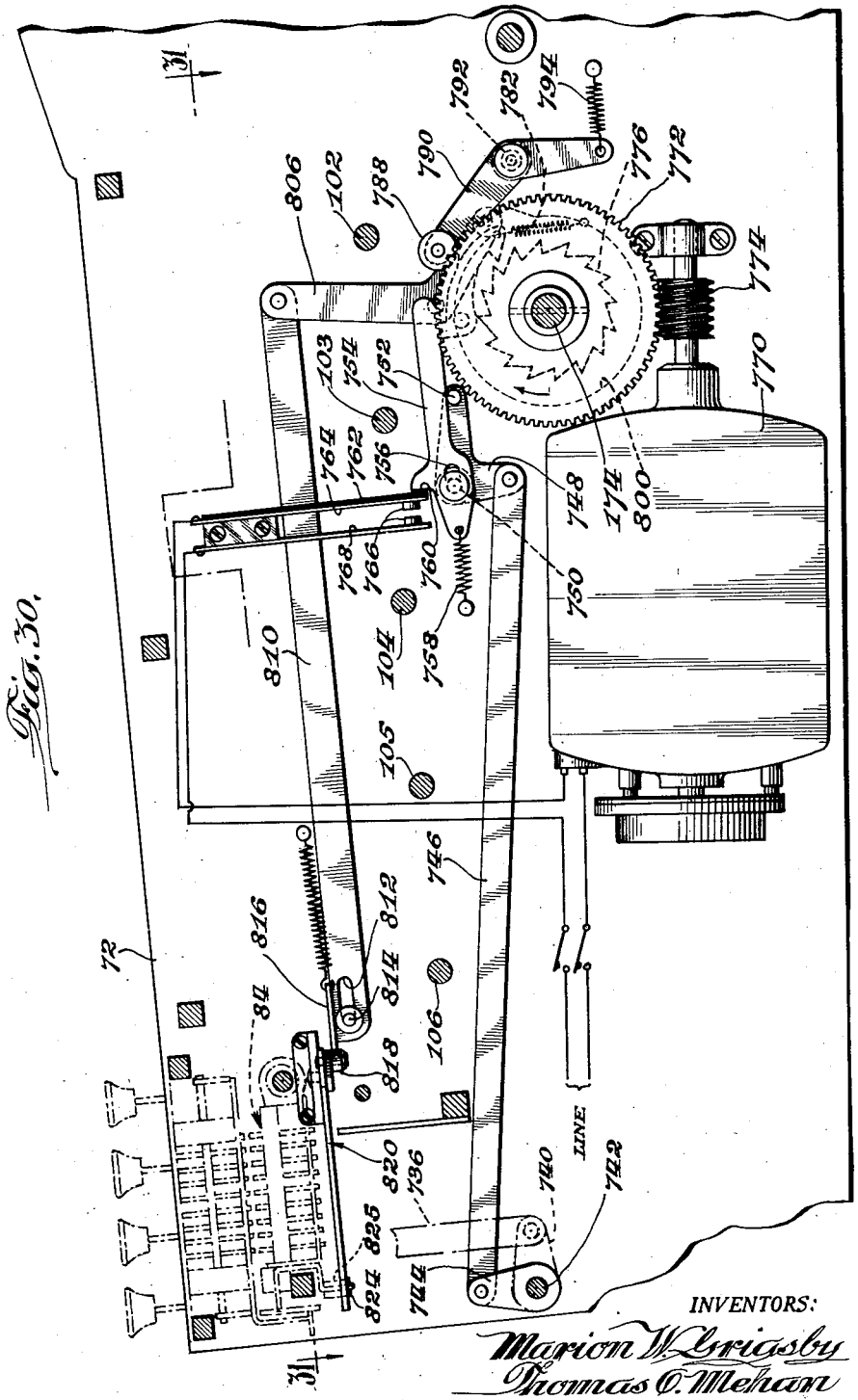

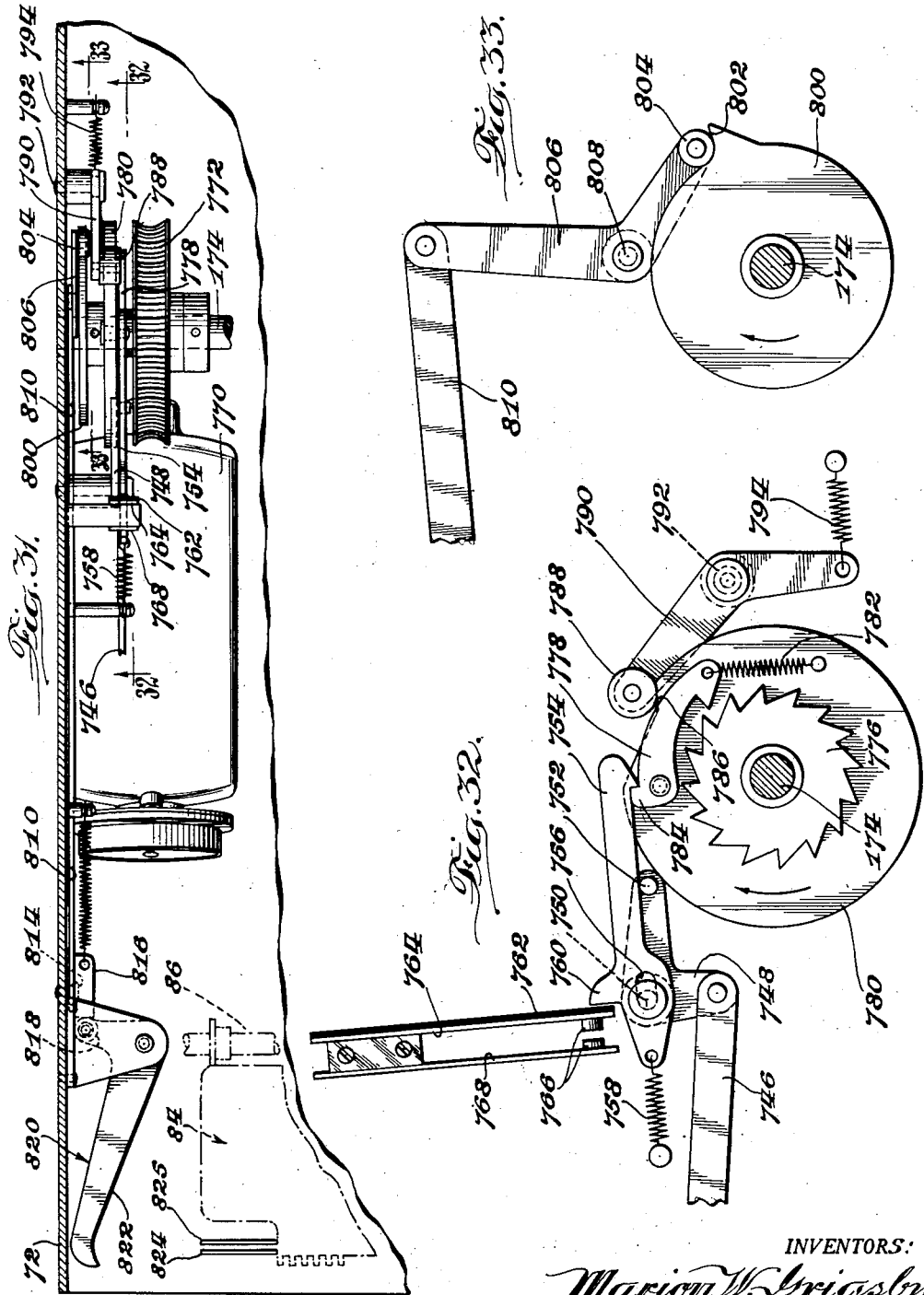

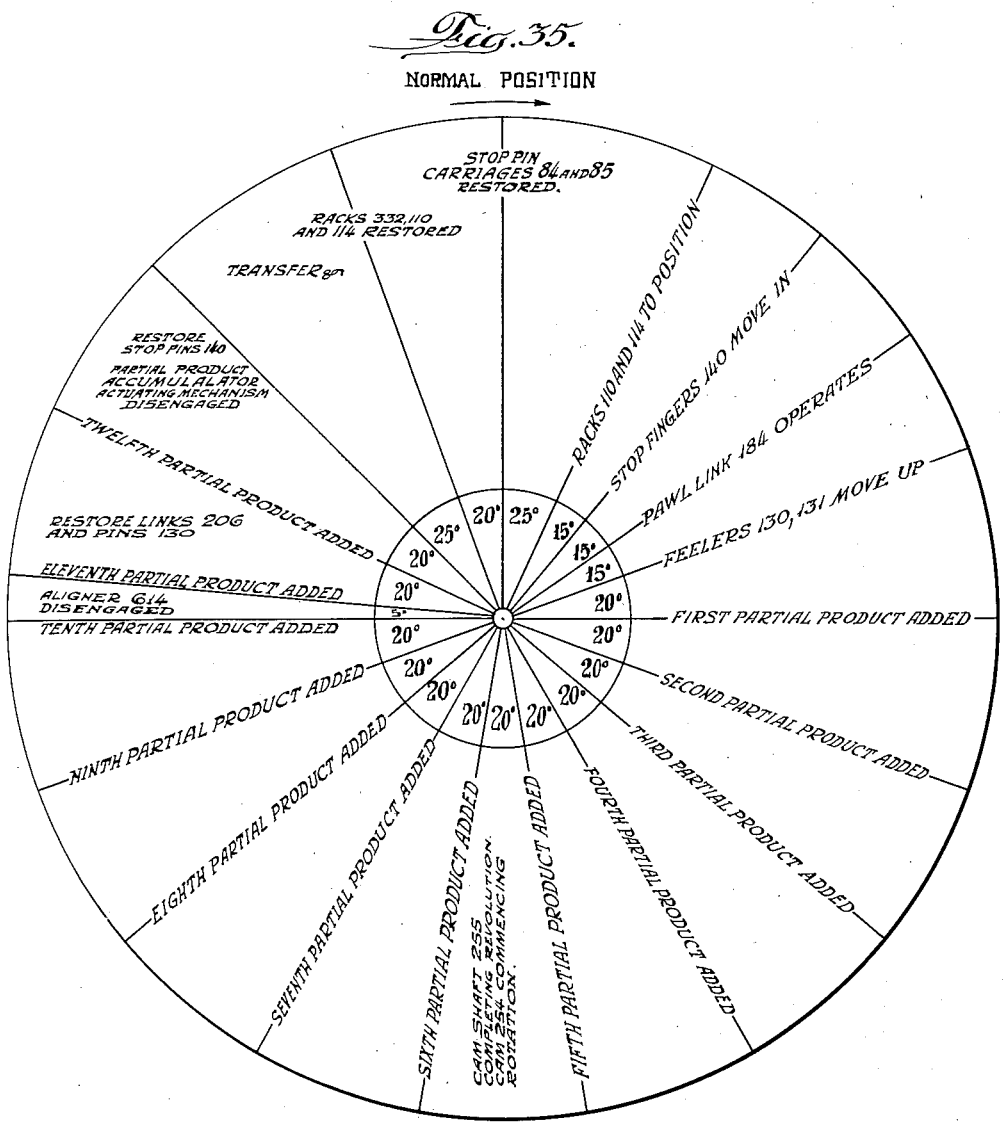

Patented Dec. 25, 1951

2,580,295

UNITED STATES PATENT OFFICE 2,580,295

PARTIAL PRODUCT MACHINE

Marion W. Grigsby, Arlington Heights, and Thomas O. Mehan, Park Ridge, Ill., assignors to Bertram J. Grigsby, Chicago, Ill., as trustee Application June 3, 1947, Serial No. 752,220

23 Claims. (Cl. 235—60)

Our invention relates generally to multiplying machines, and more particularly to the so called notched plate multiplying machines wherein partial products are derived and accumulated to furnish the product.

Various types of multiplying machines have been proposed in the past, some operating on the principle of repeated addition of the multiplicand in successive denominational orders. In machines of this type, the multiplication of two factors, such as 99,999 by 999,999, would require forty-five separate adding operations, usually plus an additional totalizing operation, making a total of forty-six operations. Most of the machines of this type cannot readily be equipped with means to print the factors and the product. In the machine of our invention, partial products are set up for each digit in the multiplier, and the machine automatically accumulates the partial products in succession, requiring for the above exemplary problem but a single machine cycle. Thus, assuming other conditions to be equal, the machine of our invention is capable of performing problems of multiplication in a very much shorter time than that required for performing a similar problem on a multiplying machine by the method of repeated addition. The advantage of this is not only the saving of time effected, but also in that the parts are subjected to correspondingly less wear, and consequently the machine may be expected to have a correspondingly longer trouble-free useful life. In addition, the machine of our invention has provisions for printing the factors and products as well as the total of a plurality of products.

It is thus the primary object of our invention to provide an improved multiplying machine utilizing notched plates to obtain the partial products, in which the factors are individually set up in keyboards of the ten key type, and in which the factors, products, and a total of a series of factors and products, may be printed to provide a record of the computation.

A further object is to provide an improved mechanism for controlling a multiplying machine of the notched plate type, to secure successive addition of the partial products represented by the positions of the notched plates.

A further object is to provide an improved means for setting up the notched plates to represent the partial products.

A further object is to provide an improved means for sensing the positions of the notched plates so as to "read" the partial products therefrom.

A further object is to provide an improved means for controlling the sensing of the partial products and securing the addition thereof.

A further object is to provide an improved means for transferring the partial products to an accumulator.

A further object is to provide an improved multiplying machine having means for registering and accumulating the amounts of the multipliers, and multiplicands, and of the products, including provision whereby instead of accumulating the factors and products, they may, if desired, be successively subtracted from an initial entry.

Other objects will appear from the following description, reference being had to the accompanying drawings, in which Fig. 1 is a perspective view of the complete machine;

Fig. 1a is a chart illustrative of the principle of operation of the machine in the performance of an exemplary problem of multiplication;

Fig. 2 is a plan view of the major operating parts of the machine, shown with the outer casing removed;

Figs. 3, 4, 5, and 6, are fragmentary vertical sectional views, taken on the lines 3—3, 4—4, 5—5, and 6—6, respectively, of Fig. 2;

Fig. 7 is a side elevational view of one of the notched plate assemblies, showing the relationship of the fingers for setting the positions of the plates, and the means for sensing the partial products determined by such positioning;

Fig. 8 is a side elevational view of a pair of notched plate assemblies, similar to that shown in Fig. 7;

Figs. 9, 10, and 11, illustrate side elevational views of the three notched plates shown in assembled relation in Figs. 7 and 8;

Fig. 12 is a fragmentary plan view of the mechanism for setting the notched plates;

Fig. 13 is a fragmentary sectional view, taken on the line 13—13 of Fig. 12;

Fig. 14 is a perspective view of one of the slide stops used to position the notched plate assemblies;

Fig. 15 is a fragmentary vertical sectional view, taken on the line 15—15 of Fig. 2, and showing the means for sensing the partial products set up by the positioning of the notched plates;

Fig. 16 is a perspective view of one of the sensing fingers employed to "read" the partial products determined by the setting of the notched plates;

Fig. 17 is a fragmentary horizontal sectional view showing the partial product limit stops and the cooperating links whereby their setting is transmitted to the partial product accumulator;

Fig. 18 is a fragmentary vertical sectional view of the mechanism shown in Fig. 17;

Fig. 19 shows the five different shapes of cams employed to control the successive sensing of the positions of the notched plates;

Fig. 20 is a horizontal sectional view of the means for controlling the successive sensing of the partial products on the notched plates;

Fig. 21 is a fragmentary sectional view, taken on the line 21—21 of Fig. 2, portions of the right outer and inner frames being broken away to show parts which would otherwise be concealed thereby;

Fig. 22 is a fragmentary horizontal sectional view, taken on the line 22—22 of Fig. 21;

Fig. 23 is a fragmentary sectional view, illustrating the means for engaging and disengaging the partial product register;

Fig. 24 is a horizontal sectional view, taken on the line 24—24 of Fig. 23;

Fig. 25 is a view showing portions of the mechanism for the movement of the factor type racks;

Fig. 26 is a fragmentary sectional view, taken on the line 26—26 of Fig. 25;

Fig. 27 is a fragmentary vertical sectional view, showing the type hammer release and restoring mechanisms as well as the platen rotating means;

Fig. 28 is a vertical sectional view, showing particularly the accumulator shifting and totalizing control mechanism;

Fig. 29 is a fragmentary sectional view, taken on the line 29—29 of Fig. 28;

Fig. 30 is a vertical sectional view, showing the motor control mechanism with the starting switch and clutch mechanism;

Fig. 31 is a horizontal sectional view, taken on the line 31—31 of Fig. 30;

Fig. 32 is an enlarged fragmentary sectional view, showing the motor switch operating and clutch release mechanism;

Fig. 33 shows a portion of the mechanism for restoring the pin carriages;

Fig. 34 is a fragmentary vertical sectional view, showing the means for rotating the notched plate assemblies for the final positioning of the notched plate assemblies;

Fig. 35 is a timing diagram showing the sequence of the operation of the various parts of the machine.

General description

In general, the multiplying machine of our invention comprises a pair of ten-key keyboards, each operable to set stop pins in an associated movable stop pin carriage, one to set up the multiplicand and the other to set up the multiplier. Each of these keyboards is provided with an individual error key for returning to normal any stop pins erroneously set up in the stop carriages. In addition, the manual controls include a motor bar for initiating a multiplying or totalizing operation, and a total key which is adapted to control the totalization of the factors and the products of a plurality of multiplying operations.

The machine is herein illustrated as capable of performing multiplication problems involving five digits in the multiplier and six digits in the multiplicand. Each digit in the multiplier is operative to select one of ten groups of stop faces on six partial product notched plate assemblies, while the multiplicand pin carriage controls the selection of particular pairs of stop faces in these groups. In this manner each notched plate assembly is moved to a position to select one of the one hundred partial products represented by the stop faces thereon.

After the multiplicand and multiplier have been set up, the motor control bar is depressed, whereupon an operating cycle of the machine is initiated. During the initial portion of the operating cycle, suitable actuator racks, cooperable with the pin carriages, are moved to abut against the set pins of these carriages so as to assume positions representing the multiplicand and the multiplier, respectively. Such positioning of the multiplier racks causes initial positioning of a plurality of assemblies of notched plates to select one of ten groups of pairs of stop faces on these plates. Immediately thereafter stops cooperable with the multiplicand racks are positioned, and through suitable mechanism provide corresponding limit stops for the positioning of the notched plate assemblies to select particular pairs of stop faces from the selected group. The notched plate assemblies are resiliently driven against these limit stops, and are thus set up to represent the partial products of the two factors entered in the keyboards.

Following this, suitable means are provided to sense the setting of the notched plate assemblies, and the partial products thus sensed are successively transferred to the subproduct accumulator. After this, the sub-product accumulator is cleared, the amount accumulated therein, together with the multiplicand and multiplier, being printed on the record tape and the amounts thereof entered in the grand total accumulators for the multiplicand, multiplier, and product, respectively.

At the termination of a plurality of multiplying operations, a total key is operated, whereupon the machine goes through a totalizing operation, whereby the total of the multipliers, multiplicands, and products are printed and the grand total cleared.

General features of construction

Referring particularly to Figs. 1 and 2, the machine comprises a suitable casing 50 provided with a multiplier keyboard 52, a multiplicand keyboard 54, a motor control bar 56, and a total control key 58. Each of the keyboards 52 and 54 includes ten numeral keys 60 and an error key 62, the latter being operatively connected to its associated pin carriage to restore the latter to normal position, and to reset to normal any depressed stop pins thereof. The machine includes a platen 64 supplied from a record tape roll 66. The machine is electrically operated, being connected to a suitable source of current through an extension cord 68.

Referring more particularly to Fig. 2, the machine comprises a base plate 70, an outer left frame plate 72, an inner left frame plate 74, a center frame plate 76, a right inner frame plate 78, and a right outer frame plate 80. The two sets of numeral keys 60 are arranged in the customary manner to control the setting of stop pins 82 mounted in the usual manner in stop pin carriages 84 and 85 (Figs. 5 and 4), respectively, for the multiplier and multiplicand. These stop pin carriages are mounted for lateral reciprocation on guide rod 86 and rail 88 and are provided with the usual "0" to "9" limit stops, as is well known in the art.

A plurality of actuator racks 90 (Fig. 5) are provided for cooperation with the pin carriage 84. In the machine illustrated, the capacity for the multiplier is five digits, and there are thus five actuator racks 90. The actuator racks 90 for the units to the ten thousand denomination orders mesh with pinions 92 to 96, respectively, these pinions being rotatably mounted on shafts 102 to 106, respectively. Each of the racks 90 has a crossover member 108 (Fig. 2) formed integrally therewith, these crossover members being respectively joined to suitably mounted slidable racks 110 which, as it will hereinafter appear, are designed for the operation of a multiplier accumulator and associated printing mechanism. The pinions 92 are resiliently connected with the shafts 102—106 by torsion springs 112, the shafts being suitably mounted for rotation in the frame plates 72, 76, and 80.

The pin carriage 85 for the multiplicand (Fig. 4) has associated therewith a plurality of actuators 114 which are adapted to be differentially set in accordance with the settings of the stop pins in this carriage. Each of these actuators 114 includes five series of stepped stops 116, as well as a rack portion 118, the latter being operable, as will hereinafter appear, to control the printing of the multiplicand amounts as well as to secure their accumulation.

Notched plate assemblies

Referring to Fig. 2, six notched plate assemblies 120 are mounted on each of the shafts 102—106, the construction of each of these assemblies being identical and shown in detail in Figs. 7 to 11. Each of these notched plate assemblies comprises three notched plates 122, 123, and 124, which are secured together by rivets 126, the plates being suitably spaced by intermediate washers 128. The notched plate 122, which may be termed a positioning plate, is at the center of each assembly, and includes ten stop sections, each section likewise including ten stepped stop faces. The notched plate 123 of each assembly is notched to provide stop faces representing the units of the various partial products, whereas the plates 124 are notched to provide stop faces representing the tens of the partial products.

Referring to Figs. 7 and 8, the arrangement of the notches whereby they represent successive partial products, will be clear. In these figures the notched plate assembly 120 is shown in zero position with respect to feelers 130 and 131, respectively cooperable with notched plates 123 and 124. When in this position, the portions of the plates 123 and 124 adjacent the feelers 130 are of maximum diameter, representing the zero position. If the assembly 120 were rotated 1/100th of a revolution clockwise from the position shown in Fig. 7, it would be apparent that the tens feeler 130 would still be opposite the "0" radius of the plate 123. This condition prevails whenever the assembly 120 is moved clockwise from the position shown in Fig. 7 within the arc or section represented by the reference character "0," that is, 1/10th of a revolution, since whenever the multiplier contains a zero, the assembly 120 under control of this zero entry will be positioned at some place within the arc "0." If the multiplier contains a digit "1," the corresponding assembly 120 will be positioned somewhere within the arc represented by the reference character "1" in Fig. 7. Similarly, digits 2 to 9 in the multiplier, as will hereinafter appear, will result in positioning the associated assemblies 120 so that the portions represented by the arcs 2 to 9, respectively, will be in alignment with the feelers 130 and 131.

Thus, for example, if the assembly 120 is rotated clockwise so as to position to the fifth position in the arcuate section 7 (to represent the partial product 7 x 5), the feelers 130 and 131 will be in the relative positions indicated by the dotted member 130 in Fig. 7. In this position will be noted that the feeler 130 would be permitted to move inwardly to engage the plate 123 at the "5" stop position. Similarly, the feeler 131 would move inwardly to engage the "3" stop position on the plate 124. This shows that the product of 7 (the arcuate group) by the factor 5 (the position in this group) is 35. The notches in the plates 123 and 124 thus represent all the partial products of the factors 0 to 9 by 0 to 9.

Each of the notched plate assemblies 120 has a stud 132 riveted thereto, this stud forming an anchor for one end of a torsion spring 134, the other end of which is anchored to an arm 136 secured to or formed integrally with a hub 138, the latter being riveted to one of the shafts 102—106, for example, shaft 102. There is thus a limited degree of freedom of rotation of the assemblies 120 on their shafts, the torsion springs 134 operating to bring the assemblies 120 to zero position with respect to their shafts because of the engagement of their arms 136 with the studs 132.

Notched plate assembly setting mechanism

As previously described, the movement of the actuator racks 90 results in rotating shafts 102—106 clockwise through an angle determined by the set stops of the pin carriage 84. Thus, each of the assemblies 120 in the shafts 102—106 is correspondingly set to bring the 0 position of one of the arcuate sections 0 to 9 above the feelers 130, 131, depending upon the numeral keys of the multiplier keyboard 52 which have been depressed, so that stop fingers 140 are respectively in alignment with the "zero" stop faces of the center plate 122 of each of the assemblies. (The stop faces nearest the center are the "zero" stop faces—see Fig. 10).

The stop fingers 140 are set in the following manner. Referring to Figs. 4, 12, and 13, it will be noted that there are five groups of sensing pins 142, there being six pins in each group. These sensing pins are guided for vertical movement in suitably fixed plates 143 and 144. Each of the pins 142 (Fig. 14) is provided with a sidewardly extending lug 146 which is engaged by the bifurcated end of an arm 148 (Fig. 4). While these arms are of different shapes to facilitate their movement, they function in essentially the same manner, each of the six arms 148 being fixed to a shaft 150, the shafts being suitably mounted for rotation in the center vertical frame plate 76 and a pair of auxiliary frame plates 152 and 153 (Fig. 12), the latter plates being suitably supported from the left and right-hand vertical frame plates 72 and 80 by support bars 154. At the right-hand ends of the shafts 150, there are fitted arms 156 (similar to the arms 148), the bifurcated ends of these arms engaging lugs 157 (similar to the lugs 146) on stop fingers 140. The stop fingers 140 are likewise guided for vertical movement, projecting through guide plates 158 and 159.

As shown in Fig. 4, the arms 148 of each group are held in elevated position by a bail rod 160 carried at the end of a pair of bail arms 161 secured to a shaft 162. As shown in Figs. 13 and 34, the shafts 162 for the first four sets of bails 160, 161, have arms 164 secured thereto, the lower ends of these arms being pivotally connected to a link 166. The rearmost of the shafts 162 has an arm 165 secured thereto, which is pivotally connected to the end of the link 166. The lower end of the arm 165 has a pin and slot connection with the upper arm of a bell crank lever 168, the lower arms thereof carrying a roller 170 cooperable with a plate cam 172 secured to a main operating shaft 174.

The main shaft 174 makes one clockwise revolution during each operating cycle of the machine, and it will therefore be apparent that shortly after the initiation of the operating cycle, the roller 170 will be permitted to move upwardly under the influence of its operating spring 176 and thereby, through the arm 165 and link 166, swing all of the bail shafts 162 counterclockwise, thereby dropping the bail rods 160 and permitting the sensing pins 142 to drop downwardly into engagement with the stepped stops 116 of the multiplicand racks 114. These pins may readily fall under the influence of gravity, but if desired they may be provided with spring means to assure their movement into engagement with the stops 116. Since the sensing pins 142 are mechanically interconnected with the stop fingers 140 (Figs. 12 and 13), the latter will move downwardly to corresponding positions.

Referring to Fig. 34, the main shaft 174 is provided with a plate cam 178 having a follower roller 180 cooperating therewith, the roller 180 being carried at the end of the lower arm of a bell crank 182, the upper arm thereof having a pin and slot connection with a pawl link 184, the bell crank being biased to swing counterclockwise by a tension spring 186. The pawl link 184 is mounted for sliding movement on shafts 188 and 189 which also serve as guides for the racks 110 and actuators 114.

The shaft 188 projects through a dog-leg slot 190 while the shaft 189 projects through a similarly shaped slot 191 in the pawl link 184. As a result of this arrangement, it will be apparent that when the bell crank 182 is swung clockwise by the cam 178, the pawl link 184 will be moved downwardly and then rearwardly (to the right, Fig. 34). Such movement causes engagement of groups of pawl teeth 192, formed along the lower edge of the link 184, with ratchet wheels 196 secured respectively to the shafts 102—106. Thus, during the initial portion of an operating cycle, the shafts 102—106 are turned clockwise through a substantial angle, as, for example, through somewhat more than 36°, such movement being permitted by virtue of the provision of the springs 112 (Fig. 2). Such movement also biases the springs 134 (Fig. 8) of the notched plate assemblies 120 so as to tend to rotate these assemblies clockwise (Fig. 7) until arrested by the stop fingers 140, the yielding of the springs 134 permitting continued motion of the shafts 102—106 after the assemblies 120 carried thereby have been stopped by their stop fingers 140.

It will be understood that as a result of this operation, the notched plate assemblies 120 will be positioned exactly to represent the partial products of the two factors set up in the keyboards 52 and 54.

It will be noted from the timing or cycling diagram of Fig. 35 that the stop fingers 140 and the sensing pins 142 drop into position before the shafts 102—106 are rotated by means of the pawl link 184. This is also apparent from the shapes of the cams 172 and 178.

*Sensing of partial products*

As best shown in Fig. 3, the feelers 130 and 131 are guided for vertical reciprocation by a pair of slotted guide plates 194 which are suitably supported by square cross rods 196 fixed in the vertical frame plates 76 and 80. Each of the feelers 130, 131 is constructed as shown in Fig. 16, having a notched forwardly bent ear 198 for the reception of a pin 200 carried by a pivoted bell crank arm 202, each of the arms being biased to move clockwise by a suitably anchored tension spring 204. The downwardly extending arms of bell cranks 202 are pivotally connected to stop links 206, respectively. The stop links 206 for the rearmost row of bell cranks 202 are shaped less like links than the others, but all function in the same manner. Each of the links 206 has a forwardly facing shoulder 208, these shoulders or lugs being normally held in engagement with a bail rod 210 carried by a pair of bail arms 212. The arms 212 are secured to a shaft 214 suitably mounted for rotation in the frame plates 76 and 80. As shown in Fig. 21, one of the bail arms 212 has a forwardly extending part 216 carrying a follower roller 218, the latter being cooperable with a cam 220 fixed to the main operating shaft 174. It will be observed by reference to Fig. 21, as well as from the cycling diagram of Fig. 35, that after the main shaft moves through an angle of approximately 70°, a spring 219 will swing the bail rod 210 forwardly, thus permitting all of the links 206 to move forwardly under the pull of the springs 204 and thus move the feelers 130 and 131 upwardly until stopped by the stop faces of the notched plates 123 and 124, respectively.

The rearward ends of the links 206 are bifurcated to provide an upper elevating arm 222 (Figs. 3 and 18), and a lower stop arm 224. The links 206 which are connected to the rearmost row of bell crank levers 202 are provided with an elongated slot 226 embracing a rod 228 so that these links 206 may pivot about the rod 228 and may slide longitudinally with reference thereto. The other links 206 merely rest on the rod 228.

The lower stop arm 224 of each of the links 206 is provided with saw toothed alignment notches 230 which are adapted for engagement with a wedge shaped aligner bar 232, the latter being carried by arms 234 secured to a shaft 236. The right-hand bail arm 234, as best shown in Fig. 21, has a forwardly extending arm 238 which carries a roller 240 for engagement with the lower cam edge 242 of an arm 244 forming part of the bail arm 212, the bail arm 234 being biased to swing clockwise by a spring 245. Thus when the arm 212 swings clockwise through a substantial angle, the end camming surface 246 of the rearward extension 244, by its engagement with the roller 240, swings the bail arms 234 counterclockwise to raise the aligner 232 to the position in which it is shown in Fig. 18, thereby locking all of the links 206 which have been lowered, in the positions determined by the extent of movement of the feelers 130, 131 with which they are connected.

The links 206 are biased to swing downwardly by suitably anchored leaf springs 250, the lower edges 248 of the upper arms 222 thereof resting upon cams 252 mounted on cam shafts 254 and 255. These cams are separated by spacing washers 256. Each of the cams 252 has a flat chordal edge 258 and the cams assume five different shapes as shown in Fig. 19. As will hereinafter appear, the shafts 254 and 255 are successively rotated through arcs of 60° and the cams 252 are so positioned on these shafts (in the relationship indicated in Fig. 19), so that flat portions 258 of these cams will successively lie in parallelism with the lower edge 248 of the arms 222 and permit the springs 250 to depress the associated links 206. This is indicated in Fig. 18, wherein the link 206 is shown in full lines in depressed position, its normal upward position being indicated by the dot-dash lines. For the sake of compactness in assembly, alternate arms 222 engage cams 252 on the shaft 254, while the intermediate arms 222 engage similar cams 252 on the shaft 255.

The shafts 254 and 255 are rotated by the mechanism best shown in Fig. 21, this mechanism comprising a notched cam plate 260 secured to the main shaft 174. A follower roller 262, carried on the end of a lever 264 pivoted on a stud 266, cooperates with the cam projections 268 on the cam 260. The other end of lever 264 has a pawl 270 pivoted thereto, the pawl being held in position to engage a six-toothed ratchet wheel 272 by a suitably anchored tension spring 274. Thus as one of the projections 268 engages the roller 262, the pawl 270 advances the ratchet wheel 272 through 60°. As the last of the projections 268 engages the follower roller 262, the first of these projections will commence engaging a similar follower roller 276 carried at the end of a forwardly projecting arm of a bell crank lever 278 pivoted on a stud 280. The rearwardly projecting arm of this bell crank lever is provided with a pivoted pawl 282 which engages a ratchet wheel 284 fixed to a shaft 254, the pawl 282 being held in engagement with the ratchet wheel by a suitably anchored tension spring 286.

The ratchet wheels 272 and 284 are provided with suitable detents to hold them in the positions to which they are moved by their pawls 270 and 282, these detents comprising rollers 288 and 289 which project through suitable apertures formed in the frame plate 80 and which are carried by arms 290 and 291 pivoted on studs 292 and 293, respectively, the ends of the detent arms 290 and 291 being urged toward one another by a spring 294 tensioned between them.

From the foregoing, it will appear that as the main shaft 174 rotates clockwise, it will, through the notched cam plate 260, first rotate the cam shaft 255, six 60° steps counterclockwise, and during the last 60° rotation of the shaft 255, will rotate the shaft 254 60° counterclockwise, and thereafter continue successively to rotate the shaft 254 in the same direction through 60° steps until the latter shaft has completed one revolution.

An understanding of the purpose and object of the mechanism which includes the cams 252 and the means for operating them, will be more clearly understood if reference be had to Fig. 1a which illustrates an exemplary problem of multiplication to be performed by the machine, namely the multiplication of a multiplicand of 999,999 by a multiplier 99,999. Assuming that these factors had been set up in the keyboards 54 and 52, respectively, and that the machine had been operated to the extent that all of the notched plate assemblies 120 had been positioned, it will be apparent that each of these notched plate assemblies will have been positioned to the ninth position of the tenth group (Fig. 7), that is, they would each have been rotated through slightly less than $99/100$ of a revolution. As a result, the feelers 130 of each of the assemblies would be in alignment with a stop 1a (Fig. 7) of the notched plates 123, while the feelers 131 would be in alignment with stop 8a of the notched plate 124. Thus all the feeler pins 130, 131, and their associated links 206 would be in positions represented by the digits of the partial products as indicated in Fig. 1a, the first two lines of partial product digits according with the partial products represented by the positions of the notched plate assemblies 120 on the shaft 102, etc., as indicated by the legends.

When the shaft 255 (Figs. 18 and 21) is rotated one-sixth of a revolution, the cams 252, carried by this shaft, are effective to permit the links 206, which are set by the notched plate assemblies 120 carried by the shaft 102, to drop to the full line position as shown in Fig. 18, in which position they are held by the aligner bar 232. As will appear hereinafter, the ends of the lower arms 224 of the links 206 are thus differentially positioned and held in such differential position for the control of the accumulating mechanism. The stop ends of the arms 224, in the exemplary problem illustrated in Fig. 1a, would all be in position to register the digit "8" as indicated by the tenth partial product in Fig. 1a. As will be described hereinafter, this setting is added into the accumulator. Thereafter the shaft 255 is rotated an additional 60°, whereupon the links 206, which were positioned under the control of the notched plates 123 of the notched plate assemblies 120 on the shaft 106, are permitted to be depressed by their associated leaf springs 250. In the illustrative example, all of these links 206 will be positioned to represent the digit "1," as illustrated by the ninth partial product of the problem shown in Fig. 1a. During such second sixty degree rotation of the shaft 255, the links 206, which had previously been lowered, are raised to inoperative position, that is, to the dotted line position shown in Fig. 18, and they will remain in this position during the remainder of the operating cycle. In a similar manner, the links 206, which were set by the notched plates 124 of the assemblies on shaft 105, are lowered to operative position (full line position in Fig. 18), where their registration may be sensed and transmitted to the accumulator mechanism. Following the next sixty degree rotation of the shaft 255, the links 206 which were set by the notched plates 123 of the assemblies on shaft 105, are lowered into operative position.

Each of the cam shafts 255 has one rest position (that is, in which all of the arms 222 are held in elevated position), and five operative positions, in each of which six of the arms 222 are permitted to drop to operative position. The same is true of the shaft 254, and since the shaft 254 is rotated through its first 60° at the same time that the shaft 255 is being rotated through its last 60° motion, it will be apparent that the arms 222, forming parts of the links 206, will in groups of six be lowered to operative position to move the stop ends of the arms 224 into effective positions. The order in which this is done is as follows: first the arms 224 which are differentially positioned by the plates 124 located on shaft 106; second, the arms 224 positioned by the plates 123 on shaft 106; third, the arm 224 positioned by plates 124 on shaft 105; fourth, the arms positioned by plates 123 on shaft 105; and thereafter, in succession the arms 224 which are differentially positioned by plates 124, then 123 located on the shafts 104, 103, and 102.

*Partial product accumulating mechanism*

Referring to Figs. 3, 6, and 17, particularly Fig. 6, there is shown a partial product accumulator comprising a plurality of pinions 296 mounted for rotation on a shaft 298, these accumulator pinions meshing with idler pinions 300 mounted for free rotation on a shaft 302. Fixed to each of the accumulator pinions 296 is a transfer cam 304 which is cooperable with a suitable tooth 306 formed on a transfer pawl arm 308. The transfer pawl arm also has a hook portion 310. Each of the accumulator pinions is adapted to be enmeshed with a pivoted actuator segment 312, each of these segments having a lug 314 projecting sidewardly therefrom, each of the lugs 314 overlying the end of the hook portion 310 of the transfer pawl 308 of the next lower denominational order (i. e., the transfer pawl associated with the segment 312 to the right). The actuator segments 312 are pivoted on a shaft 315.

Each of the transfer pawls has a pivoted latch 316 associated therewith, the latch 316 being pivoted on a shaft 319 and biased to swing clockwise by a spring 318 tensioned between the latch 316 and its associated pawl 308, this spring also serving to hold the tooth 306 of the transfer pawl 308 in engagement with the transfer cam 304. When an accumulator pinion 296 rotates from its 9 to its 0 position, the tooth of the transfer cam 304 cams the transfer pawl 308 associated therewith in a counterclockwise direction, in which position it is latched due to the clockwise swinging of the latch 316. The movement of this latch 316 is limited by a restoring rod 320. The accumulator shaft 298 and the idler shaft 302 are mounted between a pair of arms 322 secured to a shaft 324. As is common in the adding machine art, the accumulator is disengaged from the actuator segments 312 during the clockwise swinging movement of these segments, and is engaged therewith during the return movement of the segments.

Thus during each adding operation, depending ears 326 on the latches 316 engage the fixed rod 320 and are swung counterclockwise, thereby permitting the transfer pawls 308 to swing back into position, in which the pawl 308 is shown in Fig. 6. When a transfer pawl 308 is tripped, its hook portion 310 is moved rearwardly from beneath the lug 314 of the next higher order segment, and thus permits the latter to move a sufficient distance to rotate its associated accumulator pinion one-tenth of a revolution, thus effecting the transfer. Such motion of the segment 312 is limited by the engagement of the lug 314 in the end of the notch formed by the hook portion 310 of the transfer pawl 308.

As will hereinafter appear an aligner bar 328 is cooperable with the teeth of the segments 312 to hold them in aligned position before the accumulating pinions are enmeshed with them. When the accumulator pinions are not in mesh with the gear segments 312, they are held from rotation by virtue of engagement of the teeth of the idler pinions 300 with the teeth of racks 330 formed at the lower ends of type carrier racks 332, which, during this portion of the cycle of operations, are stationary.

Each of the gear segments 312 has an offset rearwardly and downwardly extending arm 334 which has pivoted thereto a link 336, the forward end of which is guided for horizontal movement by a fixed rod 338 extending through elongated slots 340 in the links 336. Each of the links 336 also has a downwardly and forwardly extending arm 342 at the forward extremity thereof. Each of the links 336 also has a shoulder 343 adapted to engage the end stop of its associated lower arm 224, one of which forms a part of each of the links 206.

The forward ends of the arms 342 are adapted, under certain conditions, to engage sidewardly extending lugs 348 formed at the rearward ends of auxiliary stop levers 350 pivoted on a shaft 352 and biased to swing clockwise by suitably anchored tension springs 354. The forwardly and upwardly extending arm of each of the levers 350 has a sidewardly extending lug 356 which lies beneath one or more of the lower arms 224 of the links 206.

In Fig. 6, the stop 346 is of sufficient width to engage the end of one arm 224 associated with the rightmost link 206. The link 336 pivoted to the next higher denominational order segment 312 has a sidewardly extending lug 358 (Fig. 20), which is adapted to be engaged by the next three links 206, the link 336 for the hundreds order segment 312 having a lug 360 for engagement with the next five links 206; the link 336 for the thousands order having a lug 362 to engage seven of the links 206. The link 336 for the ten-thousands order having a corresponding lug 364 for engagement with the next nine links 206; the link 336 for the hundred-thousands order having secured thereto a plate 366 for the engagement of the next ten links 206; the link 336 for the millions order having a lug 368 to engage the next nine links 206; the link 336 for the ten-millions order having a plate 370 for engagement with the next seven links 206; the link 336 for the hundred-millions order having a lug 372 for engagement with the next five links 206; the link 336 for the billions order having a plate 374 for the engagement of the next three links 206, and the link 336 for the ten-billions order having a stop portion 376 (similar to the stop 346) for engagement with the last link 206.

In a similar manner, the lugs 356 forming parts of the auxiliary stops 350 (Fig. 6) are of widths corresponding to the stop portions 346, 358, 360, etc., which form part of or are secured to the links 336. Thus, when the selected links 206 are permitted to move downwardly due to the positioning of the cams 252, they at the same time swing auxiliary stop levers 350 which have lugs 356 (lying beneath such depressed links) in a counterclockwise direction, thus elevating the rearward stop lugs 348 thereof to permit forward motion of the links 336 associated therewith, there being one lever 350 for each of the links 336.

The actuation of the gear segments 312 and moving their arms 336 into engagement with the set arms 224 of the links 206, is effected through a torsion spring 380 individual to each of the segments 312, the ends of this torsion spring crossing, as shown in Fig. 6, and provided with opposed hook portions cooperable with a bail rod 382 carried by a pair of arms 384 fixed to the shaft 315. Each of the actuator segments 312 is provided with a pair of lugs 386, 387, which limit the extent of movement of the projecting ends of the torsion spring 380.

As will be noted from Figs. 6 and 21, the bail rod 382 is normally in engagement with one of the ends of the spring 380 so as to apply a torsional force thereto which is required in the event that a transfer is to take place.

Adjacent its right-hand end, the shaft 315 has an arm 388 (Fig. 21) rigidly secured thereto, this arm being pivotally connected to the rearward and upwardly extending end of a link 390. The link 390 has its forward end pivotally connected to the downwardly extending arm of a bell crank lever 392 which is pivoted upon a suitable stud 394 and carries at the end of its rearwardly projecting arm a cam roller 396 which is cooperable with a notched plate cam 398. It will be noted that the follower roller 396 projects through a suitable opening 400 in frame plate 80. The follower roller 396 is held in engagement with the edge of the plate cam 398 by a suitably anchored tension spring 402 secured to the link 390. The relative angular spacing of the projections on plate cams 260 and 398 is such that the shaft 255 (and subsequently the shaft 254) are operated alternately with the operation of the bell crank lever 392, so that the selected links 206 will be in their lowered position at the time that the actuator segments 312 are operated clockwise and then counterclockwise, due to the engagement of the follower roller 396 with the notches in the plate cam 398.

As the bail rod 382 is swung rearwardly (clockwise, Fig. 21), it engages the hook portion 404 at the rearward end of an arm 406 which is pivoted to one of the arms 322 by means of shaft 319.

Thus, upon the clockwise swinging of the bail rod 382, the accumulator supporting arms 322 will be swung counterclockwise to bring the accumulator pinions 296 into mesh with the actuator segments 312. Upon the return or counterclockwise swinging movement of the bail rod 382, it will engage the end of the rearwardly projecting arm 408 (Fig. 23) which is pivoted on the shaft 319 and has a forwardly extending arm 410, the lever comprising the arms 408 and 410 being biased to swing counterclockwise by a tension spring 412, such movement being limited by a lug 414 formed at the rearward end of a link 416. As the accumulator arms 322 are swung clockwise, a link 418 (Fig. 21) pivotally secured to a depending extension 419 of the arm 322 is moved forwardly and through a pin and slot lost motion connection swings a pair of bail arms 420, connected by a bail rod 422, in a counterclockwise direction. The bail rod 422 lies behind the lower end of the actuator segments 312 (Fig. 6) and in the event that any of the latter have moved to a carrying or transferring position, the bail rod 422 will engage them and restore them to normal position, allowing the lug 314 to disengage itself from the notch formed by the hook portion 310 of the transfer pawl 308. The arms 420 are secured to a shaft 424 suitably mounted for rotation in the frame plates 76 and 80.

As best shown in Fig. 21, a bell crank detent 426 having a V-shaped detent nose 428 is biased to swing counterclockwise by a suitably anchored tension spring 430, to hold the nose 428 in engagement with a roller 432 rotatable on a stud 434 secured to the lower extension 419 of one of the accumulator carrying arms 322. This detent operates resiliently to maintain the accumulator pinions in mesh with the actuator segments 312 when in one position, and to maintain the idler pinions 300 in mesh with the rack 330 when the accumulator carrying arms 322 are swung counterclockwise to their other position.

The above mentioned aligner bar 328 (Fig. 6) is carried by an arm 436 and the upwardly extending arm 438 (Fig. 21) of a bell crank lever, this arm and lever being fixed to a shaft 440. The bell crank lever has a rearwardly extending arm 442 carrying a roller 444 at its extremity, the roller being cooperable with a plate cam 446 secured to the end of the shaft 315. Thus, as the shaft 315 is rotated clockwise, it will, near the end of such movement, cause the high portion of the plate cam 446 to engage the roller 444 and thus swing the shaft 440, and hence arms 436 and 438, clockwise to bring the aligner bar 328 into mesh with the teeth of the actuator segments 312. This occurs just before the bail rod 382 engages the hook 404 of the arm 406, and thus the actuator segments 312 are held in their differentially adjusted positions just prior to the time that the accumulator pinions 296 are brought into mesh therewith. During the movement of the actuator segments 312, the aligner bar 328 is disengaged from the actuator segments 312 by a suitably anchored tension spring 448.

*Product accumulating and printing mechanism*

After all of the partial products represented by the setting of the notched plates assemblies 120 have been entered in the accumulator comprised by the pinions 296, it is, in most instances, desirable to enter the product in a product accumulator and to print the product on the record tape. The means for accomplishing this is best shown in Figs. 3, 6, 23, 28, 29.

Associated with each of the twelve accumulator pinions 296 is a type carrier 332 which, as previously mentioned, includes a rack 330 adapted to be meshed with the idler pinions 300. The type carriers 332 are guided for vertical movement on a pair of rods 450 and 451 which project through elongated slots 452 and 453, respectively, in the type carriers. The type carriers are spaced and guided by a pair of suitably fixed combs 454 and 455, and are biased to move upwardly by tension springs 456. Each of the type carriers has mounted thereon the usual spring returned type 458. The product accumulator comprises twelve accumulator pinions 460 mounted for rotation upon a shaft 462. Each pinion has twenty teeth and has secured thereto a transfer cam 464 having two camming projections 466. The shaft 462 is carried by a pair of arms 468 fixed to a shaft 470, which is mounted for rotation in the frame plates 74, 76, and 78.

Each of the transfer cams 464 has associated therewith a transfer pawl 472 pivoted on a shaft 474 spaced and guided by a suitable comb 476, the pawls being normally urged to pivot in a clockwise direction by tension springs 478. Each of the pawls 472 has a downwardly extending arm terminating in a nose portion 480 cooperable with the cam projections 466, and has an upwardly extending arm 482 cooperable with a latch 484. The latches 484 are freely pivotable upon a shaft 486 and are spaced and guided by a comb 488, the latches being held in cooperative relation with the transfer pawl arms 482 by the springs 478. Each of the transfer pawls 472 has a rearwardly extending portion providing a cam face 490 cooperable with a pin 492 on an arm 494, the arms 494 being pivoted on a rod 496 suitably supported in the frame plates and being biased for clockwise movement by suitably anchored tension springs 498. The lower end of each of the arms 494 has a double notch 500 formed therein for cooperation with a pin 502 projecting sidewardly from a transfer segment 504, the segments 504 being pivoted on a shaft 506 and each being biased to move either clockwise or counterclockwise by a tension spring 508 which is secured between the rearward end of each of the transfer segments 504, and a rod 510 carried by a pair of bail arms 512 secured to the shaft 506. The position of the bail comprising the rod 510 and arms 512, determines the direction in which the transfer segments 504 will be moved by their springs 508 when the locking arms 494 are swung to release the transfer segments.

The release of the transfer segments is accomplished when the accumulator pinions 460 are disengaged from the racks 514 on the type carriers 332, and when they are engaged with the transfer segments 504.

The shifting of the accumulator is accomplished by the following mechanism. A pair of plate cams 516 and 517 (Fig. 28) are secured to the main shaft 174 and are engaged respectively by follower rollers 518 and 519, the rollers being mounted on a rocking plate 520 pivoted on a stud 522. The rocking plate 520 has a pair of pins 524, 525 projecting sidewardly therefrom, these pins being respectively cooperable with notches 526 and 527 formed at the end of a shift plate 528.

As shown in Fig. 28, shift plate 528 is in adding position with its notch 527 in engagement with the pin 525. The shift plate 528 is pivoted to a plate 530 pivoted on a stud 532, the plate 530 having a cam slot 534 formed therein for the reception of the accumulator shaft 462. It will be apparent from Fig. 28 that toward the end of the operating cycle of the machine, the rocking plate 520 will be pivoted counterclockwise, and just prior to the completion of this cycle will be pivoted clockwise. The counterclockwise pivotal movement of the rock plate 520 will, through the shift plate 528 and cam plate 530, swing the accumulator pinions 460 into engagement with the racks 514. Such movement of the accumulator shaft 462 will swing an arm 536 (Fig. 6) counterclockwise, since the latter is connected by a link 538 with the accumulator shaft 462. The arm 536 is pivoted on a stud 540 and has an elongated slot 542 in the upper end thereof. One of the arms 512 has an upwardly projecting portion 544 carrying a pin 546 projecting sidewardly into the slot 542. By this means the bail arms 512 and the bail rod 510 are shifted to the position shown in full lines whenever the accumulator is brought into engagement with the racks 514, thereby conditioning the transfer segments 512 for effecting a transfer in a positive direction.

When an accumulator pinion 460 rotates from the 9 to 0 position, and thus trips its transfer pawl 472, the latter is held in tripped position by its associated latch 484. When, just prior to the completion of the operating cycle of the machine, the rock plate 520 is shifted clockwise, it will, through the shift plate 528 and cam plate 530, rock the accumulator pinions from the position shown in Fig. 6, where they are in engagement with the racks 514, to a position in which they engage the transfer segments 504. Such counterclockwise swinging of the accumulator assembly will cause the cam edge 490 of such transfer pawls as have been tripped to engage pins 492 and thus swing their associated arms 494 counterclockwise to disengage the deep portion of their notches 500 from the pins 502, thus freeing their associated transfer segments 504 for swinging movement in a clockwise direction. It will be understood that as the accumulator frame (462, 468) swings counterclockwise, the bail arms 512 and bail rod 510 will be swung clockwise from the position in which these parts are shown in full lines in Fig. 6, to the dotted lines. Thus, such transfer segments as are unlocked by movement of their associated locking arms 494, will be rotated in a clockwise direction through an angle sufficient to advance the then engaged accumulator pinions through one-twentieth of a revolution, thus effecting the transfer.

Immediately prior to the completion of the operating cycle of the machine, when the accumulator pinions 460 are reengaged with the racks 514, the bail 510, 512 is again shifted to its full line position (Fig. 6), so as to restore the transfer segments 500 to their normal positions.

The transfer pawl latches 484 are restored, to reset such transfer pawls 472 as have been actuated, at the time that the accumulators are engaged with the racks 514. The means for resetting the latches 484 comprises a bail rod 550 carried by a pair of bail arms 552 secured to the shaft 486, the bail rod 550 lying beneath projections of the latches 484.

As best shown in Fig. 28, one of the bail arms 552 has a pin 554 projecting through a suitable opening in the frame plate 80. An actuating link 556 has its lower end pivoted to the cam plate 530 and has a cam surface 558 held in engagement with a fixed stud 560 by a suitably anchored tension spring 562. The actuating link 556 has a shoulder 564 which, when the cam plate 530 is swung counterclockwise to bring the accumulator pinions 460 into mesh with their racks 514, will engage the pin 554 and swing the bail 550—552 counterclockwise, thereby resetting such of the latches 484 as have been moved to latching position with respect to their associated transfer pawls 472. As the link 556 moves upwardly, it is swung counterclockwise, due to the engagement of its cam surface 558 with its pin 560, this counterclockwise movement thus effected being sufficient to disengage the shoulder 564 from the pin 554, thus permitting the bail 550, 552 to swing clockwise and thereby restoring the transfer pawl latches 484 to normal position.

After all of the partial products have been added into the accumulator comprising pinions 296, the idler pinions 300 associated therewith will be in mesh with the rack 330.

As best shown in Figs. 23 and 24, the main shaft 174 carries plate cams 566 and 567. The cam 566 is also provided with a roller 568. Near the beginning of an operating cycle the roller 568 engages a cam edge 570 on an arm 572 of a two-armed lever 574 pivoted on a stud 576.

Subsequently, as will appear hereinafter, the roller 568 engages a cam edge 578 formed on the other arm 580 of lever 574 to swing it clockwise and thereby, through the link 416, disengage the partial product accumulator from the racks 330. A lever 582 pivoted on a stud 584 carries a follower roller 586 which cooperates with the plate cam 566 while a similar roller 588, also carried by the lever 582, is cooperable with the cam 567. The rearwardly extending arm of the lever 582 has a gear segment 590 formed thereon, this segment meshing with a segment 592 formed on an arm 594 fixed to a shaft 596.

The arm 594 forms part of a bail which includes a bail rod 598 and an arm 600 (Fig. 6). The bail rod 598 overlies forwardly projecting lugs 602 on the type carriers 332 for the products, and this bail rod thus normally holds the type carriers in their lowermost positions against the tension of their actuating springs 456. When the bail rod 598 is swung upwardly (counterclockwise), it engages the forward end of the lever 410 and swings the latter clockwise to remove the rearward arm 408 of this lever from the position in which it may be engaged by the bail rod 382. Further counterclockwise swinging movement of the arm 594 causes it to engage a roller 604, carried by one of a pair of bail arms 608, to swing the latter clockwise. The bail arm 608 is fixed to a shaft 610 to which the other bail arm 612 is also fixed (Fig. 6), the bail arms 608 and 612 being joined by an aligning bar 614 which is engageable with teeth of racks 616 formed at the forward edges of the type carriers 332.

It will be understood that as the bail 598 swings upwardly, the idler pinions 300 are in mesh with their racks 330, and the upward movement of the type carriers is limited by the engagement of the tooth portions of the transfer cams 304 with the noses on the transfer pawls 308 when the accumulator pinions have been rotated to zero position. (In Fig. 6, the accumulator pinions 296 and associated parts are not in normal position.) Thus, by the time that the aligning bar 614 is brought into engagement with the teeth of the racks 616, the type carriers 332 will have been differentially positioned to represent the total of the partial products previously added into the accumulator 296. After the printing has taken place, as will hereinafter be described, the roller 568 (Fig. 23) engages the cam edge 578 and, by swinging the bifurcated arm 574 clockwise, through the link 416, swings the assembly including the accumulator 296 counterclockwise to disengage the idler pinions 300 from the racks 330, such movement being permitted since at this time the lever 408—410 is swung to its dotted line position (Fig. 23) and the end of the arm 408 thereof is therefore not in alignment with the bail rod 382. At approximately the same time that the accumulator 296 is thus disengaged, the accumulator pinions 460 are brought into engagement with their racks 514 by the engagement of the rise portion of the cam 517 (Fig. 28) with the roller 519, thereby swinging the rock plate 520 counterclockwise and the accumulator shift plate also counterclockwise. Thus when the roller 586 (Fig. 23) rides along the rise portion of the cam 566 and the lever 582 thus swung counterclockwise and the bail 594—598—600 swung clockwise, it will restore the type carriers 332 to normal position, and in doing so effect the addition in the accumulator 460 of the product which had previously been entered in the accumulator 296.

A plurality of type hammers 618 (Fig. 6) are pivoted upon a shaft 620, and urged to swing clockwise to strike type 458 by tension springs 622. Each of the type hammers 618 is normally held in retracted position by the engagement of a projection 624 thereof with a slotted sear plate 626 which is secured to a shaft 628. Each of the type hammers 618 has cooperating therewith a zero eliminating latch 630 pivoted on a rod 632. Each of these latches has a sidewardly bent ear 634 which may overlie a projection 636 of its associated type hammer, and also has a rearwardly projecting arm 638 having a sidewardly bent lug 640 which, when its associated type carrier 332 is in zero position, lies opposite a notch 642 formed in the type carrier 332. Each of the latches 630 also has a sidewardly bent ear 644 which lies beneath the edge 646 of the next adjacent higher order latch 630. The latches are biased for clockwise movement by tension springs 648 and are normally held in the position shown in Fig. 6 by a bail rod 650 carried by arms 652 secured to the shaft 632. The type hammers 618 are suitably spaced by a comb 654, while the latches 630 are spaced and guided by combs 656 and 658.

When the type carriers have been raised to printing position and after the aligning bar 614 has been brought into mesh with the rack 616, the bail 650, 652 is swung clockwise, thereby applying additional tension to the springs 648 and tending to cause the latches 630 to swing clockwise. However, if the type carrier associated with the latch is elevated above its zero position, the lug 640 of the latch will not engage in the notch 642, but will be arrested by the forward edge of the type carrier or by the teeth of the racks 616, and such latch will thus be maintained in substantially the position in which it is shown in Fig. 6. If, however, the associated type carrier 332 is in zero position, the latch 630 cooperating therewith will be permitted to swing clockwise due to the provision of the notch 642, and in so doing, its lug 634 will swing to a position above the projection 636 of the type hammer 618 and prevent such type hammer from swinging to strike the type when all of the type hammers are released by the sear plate 626. In so doing, it will similarly operate the latches of all higher denominational orders.

The means for operating the bail 650—652 is best shown in Fig. 27. A plate cam 660, secured to the main shaft 174, has a follower roller 662 cooperating therewith, this roller being carried by one arm of a bell crank lever 664 pivoted on a stud 666. The other arm of the bell crank 664 is pivotally connected to a link 668 which is biased for upward and rearward movement by a suitably anchored tension spring 670. The upper end of the link 666 is pivotally connected to an arm 672 which is fixed to shaft 620. Also fixed to the shaft 620 are a pair of bail arms 674 which support a bail rod 676. Adjacent its upper end the link 668 is provided with a notch 678 which embraces bail rod 650. Thus after the type carriers 332 have been elevated to printing position, the upward movement of the link 668, through its connection with the arm 672, swings the bail 674, 676 clockwise a sufficient distance to permit the hammers to strike the type. Thereafter the lower shoulder of the link 668, at the notch 678, engages the bail rod 650 and swings this bail clockwise to permit the zero eliminating latches 630 to move to type hammer locking position in the event that the associated type carriers have not moved from zero position.

After the zero eliminating latches 630 have thus been permitted to move to latching position, the sear plate 626 is moved to release the type hammer 618, such movement being effected through a link 680, the lower end of which is pivotally connected to the bail rod 650 and the upper end of which has a pin and slot lost motion connection with an arm 682 secured to the shaft 628.

The platen 64 is mounted for rotation in the customary manner, and has connected thereto a ratchet wheel 684. A pawl 686 is pivotally mounted at the end of the arm 688, pivoted on the center shaft 690 of the platen, and is resiliently biased to engage the ratchet wheel 684. An actuating link 692 has its rearward end pivoted to the arm 688 and its forward end pivotally connected to the arm 672, and thus as the link 680 is moved downwardly as the follower roller engages the rise portion of cam 660, the arm 688 will be swung clockwise to line-space the record tape. Return movement of the link 686 also swings the type hammer restoring bail 674—676 in a counterclockwise direction to restore the type hammers 618 to their normal positions, in which they are again latched by the sear plate 626. The sear plate is biased to swing clockwise by a tension spring 694, the lost motion connection between the link 680 and arm 682 permitting the projections 624 on the type hammers 618 to cam past the sear so as to engage in the slot thereof.

*Factor accumulation and printing*

When, as initially described, the actuating racks 110 for the multiplier are moved rearwardly, they are driven by their associated type carriers 332 due to the interposition of pinions 696 (Fig. 5) which engage both the racks on the actuators 110 and the racks 616 on the type carriers 332 and are freely rotatable on shaft 697. At this time the multiplier accumulator pinions 700 are disengaged from their racks 514. The type carriers 332 thus move to positions corresponding to the value of the multiplier, and printing of the amount of the multiplier is effected simultaneously with the printing of the product, as previously described.

Similarly, the multiplicand racks 118 are operated through pinions 702 (Fig. 4) by the associated type carriers 332, the multiplicand accumulator pinions 704 being disengaged from the racks 514 during this upward movement of the type carriers. The pinions 702 are freely rotatable on the shaft 697. Both the multiplier accumulator, comprising the pinions 700 and the multiplicant accumulator comprising the pinions 704 are of the same construction as the product accumulator 460 and operate simultaneously therewith in the same manner, since the pinions of all the accumulators are mounted on the same shaft 462.

The only structure related to the type carriers for the multiplier and the multiplicand which is not common to the type carriers for the product, is the mechanism for securing alignment of the multiplier and multiplicand type carriers, which is shown in Figs. 25 and 26.

This mechanism is similar to the means previously described for the operation of the aligner bar 614, and comprises a pair of plate cams 708 and 709, respectively cooperable with follower rollers 710 and 711 carried by a lever 712 pivoted on the shaft 584. The lever 712 has a gear segment 714 meshing with gear teeth 716 formed on a bail arm 718 which is secured to a shaft 720. A bail rod 722 is secured to the end of the bail arm 718 and another bail arm (not shown, which is also secured to the shaft 720). The bail rod 722 overlies projections 602 of the type carriers 332 associated with the multiplier and multiplicand accumulators 700 and 704. The bail 718 is swung counterclockwise by the cam 708 shortly after the commencement of the operating cycle to permit the multiplier and multiplicand racks and type carriers to move to their positions determined by the set stop pins of the stop pin carriages. As the bail arm 718 approaches its farthermost excursion, it engages a roller 724 carried by a lever 726 which, together with another suitable arm (not shown) secured to a shaft 728, supports an aligning bar 730 which is engageable with the racks 616 of the multiplier and multiplicand type carriers 332, the aligner bar 730 being biased to swing away from the type carriers by a tension spring 732.

The type hammers 618 for the multiplier and multiplicand type carriers are controlled by a sear plate 734 (Fig. 2) which is secured to the shaft 628 to which the sear plate 626 is also secured.

Near the end of the operating cycle the racks 114 and 90—110 are returned to normal positions as the bail rod 722 (Fig. 25) is swung downwardly to return the type carriers 332 (for the multiplier and multiplicand) to their normal positions.

*Driving and operating mechanism*

The motor bar 56 is secured to a stem 736 (Fig. 28) and is biased to its upper position by a tension spring 738. The lower end of the motor bar stem 736 is pivotally connected to an arm 740 secured to a shaft 742. The shaft 742 also has an arm 744 (Fig. 30) secured thereto, this arm being connected by a link 746 with a bell crank 748 which is pivoted on a stud 750. As most clearly shown in Figs. 30 and 32, the rearwardly projecting arm of the bell crank lever 748 has a sidewardly projecting pin 752 which lies beneath a latch 754 which has an elongated slot 756 embracing the stud 750. The latch 754 is biased to move forwardly by a suitably anchored spring 758 and has a projection 760 which is adapted, when the bell crank lever 748 is swung counterclockwise by depression of the motor bar 56, to engage an insulating sheet 762 attached to a flexible switch arm 764 and thereby close the switch which includes contacts 766 and a rigid switch arm 768.

Closing the contacts 766 completes a circuit to the driving motor 770 (Fig. 30), which drives a worm wheel 772 by means of a worm 774. The worm wheel 772 is normally free to rotate on the main shaft 174 and has a ratchet wheel 776 secured thereto. A pawl 778 is pivoted on a plate cam 780 which is pinned to the main shaft 174, the pawl 778 being biased to engage with the teeth of the ratchet wheel 776 by a tension spring 782. When the bell crank 748 is swung counterclockwise upon depression of the motor bar 56 and the latch 754 thus raised, it is disengaged from the tail 784 of the pawl 778 and the latter is drawn into engagement with the teeth of the ratchet wheel 776, establishing a driving connection between the worm wheel 772 and the main shaft 174. The main shaft 174 is thus driven through one revolution, at which time the latch 754 engages the tail 784 of the pawl 778 and the latter is disengaged from the ratchet wheel 776.

The cam plate 780 has a rise portion 786 and is engaged by a roller 788 carried by a detent lever 790 pivoted on a stud 792 and held in engagement with the edge of the cam plate 780 by a relatively strong tension spring 794. Thus when the parts are in the position shown in Fig. 32 (that is, normal position) the roller 788 acting against the rise portion 786 of the cam tends to move the plate cam 780 clockwise, thus overcoming the tendency of the spring 782 to move the plate cam 780 counterclockwise, which movement would, if permitted, cause the pawl 778 undesirably to engage or partially engage the ratchet wheel 776.

*Pin carriage restoring mechanism*

The main shaft 174 has a cam 800 fixed thereto (Fig. 33), this plate cam having a single rise 802 which cooperates with a follower roller 804 carried at the end of one arm of a bell crank lever 806. The bell crank lever is pivoted on a stud 808 and its other arm is pivotally connected to the rearward end of a link 810, the forward end of this link having an elongated slot 812 (Figs. 30 and 31) through which a stud 814 projects so as to guide the forward end of the link 810. The forward end of the link has a sidewardly bent lug 816 (Fig. 31) which abuts against a roller 818 mounted on one arm of a restoring bell crank lever 820. The other arm 822 of the bell crank lever is adapted to engage a pair of flat bars 824 and 825. The bar 825 is secured to the left-hand pin carriage 84, while the bar 824 is secured to the pin carriage 85. Near the end of an operating cycle, the rise portion 802 (Fig. 33) of the plate cam 800 swings the bell crank lever 806 counterclockwise, and hence moves the link 810 forwardly and swings the bell crank lever 820 (Fig. 31) counterclockwise so as to restore both pin carriages 84 and 85 (to the right) to their normal or home positions. The machine is thus in condition for entry of an additional problem of multiplication.

Grand total taking mechanism

The total key 58 is secured to a key stem 826 (Fig. 28) and is normally held in its upper position by a tension spring 828. The lower end of the key stem 826 is pivotally connected to one arm of a bell crank 830 which is pivoted on a stud 832, the other arm of this bell crank being pivotally connected to link 834. The forward end of the link 834 is pivoted to an arm 836 fixed to a shaft 838, the latter being suitably mounted for rotation in the frame plates 72 and 80. Also fixed to the shaft 838 are a pair of arms 840 which are respectively positioned beneath and slightly to the left of the lower plate of each of the pin carriages 84 and 85, the arrangement being such that if the pin carriage is displaced, as by the entry of a single digit therein, the rearward ends of the arms 840 will engage the bottom plate of the pin carriage and thus prevent the depression of the total key. If the pin carriages are in home position, the arms 840 will engage the usual hinged zero stop plate so as to permit the forward movement of the actuators 90 and 114 so as to permit their effective movement during the total taking operation.

The stud which pivotally connects the arm 836 with the link 834 carries a roller 842 which lies in front of the upper end of an arm 844 which is secured to the shaft 742 so that when the total key is depressed, the shaft 742 is rocked clockwise in the same manner as is accomplished by the depression of the motor control bar. Thus, mere depression of the total key initiates the machine cycle for the total taking operation.

The rearward end of link 834 is pivoted to a depending arm of a bell crank 856 secured to shaft 697. A bell crank 857, similar to 856, is similarly secured to the shaft 697. The depending arm of bell crank 857 is pivotally connected to the forward end of a slide 859 which has an elongated slot 846 therein embracing a shaft 848. Adjacent the slot 846 the slide 859 is provided with a cam edge 850 which is engageable with a bail rod 852 carried by a pair of bail arms 854 secured by the shaft 848. The bail rod 852 overlies the rearwardly projecting portions of transfer pawls 472 (Fig. 6) associated with the multiplier, multiplicand, and product accumulators. When the link 834 and slide 859 are moved rearwardly at the start of the total taking operation, the cam edge 850 depresses the bail rod 852 and the latter, by engagement with the rearward projections of the transfer pawls 472, holds the nose portions 480 of these pawls in engagement with the various transfer cams of these accumulators so as to provide a rigid zero stop therefor. The bell crank 856, which is secured to the shaft 697 and has one arm thereof pivotally connected to link 834, has its other arm pivotally connected to the upper end of a link 864. The lower end of link 864 is pivoted on a pin 866 carried by link 416.

The forwardly extending arm of bell crank 857 is pivotally connected to the upper end of a link 858. The lower end of the link 858 is provided with an elongated slot 860 embracing a pin 862 secured in the accumulator shift plate 528. The upper end of a link 864 is pivoted on the pin 862, while its lower end is pivoted on a pin 866 secured to link 416. An additional link 868 has one end pivoted on the pin 866 and the other end pivoted to a hook 870. The hook 870 has its rearward end pivoted on a stud 872, while its forward hook portion 874 normally lies above and forwardly of the bail rod 210 which, it will be recalled, restores the links 206 to normal position. Thus, when the total key is depressed, the hook 870 is swung downwardly so that its portion 874 lies in front of the bail 210 and thus prevents the bail 210 from moving forwardly to release the links 206. When the total key is depressed the link 416 is swung downwardly to disengage its notch 413 from the shaft 319.

Thus when the link 416 (Fig. 28) is pulled forwardly, it will not bring the partial product idler pinions 300 into mesh with the racks which, if it occurred, would of course prevent free movement of the type carriers 332 during the total taking operation. The downward swinging movement of the link 416 through engagement of its sidewardly projecting lug 414 (Fig. 23) which overlies the arm 408, swings the latter clockwise out of the path of movement of the bail rod 382, so that the oscillation of the latter will not cause the idler pinions 300 to engage their racks 330.

The depression of the total key also through the link 858 (Fig. 28) swings the accumulator shift plate 528 counterclockwise so as to disengage the notch 527 from the pin 525 and cause engagement of the pin 524 in the notch 526. Such movement of the accumulator shift plate 528, due to the camming action of the pin 524 as it approaches and enters the notch 526, causes the shift plate to move rearwardly (to the right, Fig. 28) and thereby swing the cam plate 530 counterclockwise and cause engagement of the accumulator pinions 460 with their racks 514. Then during the latter part of the cycle, when the follower roller 519 is engaged by the rise portion of the cam 517, it will swing the rock plate 520 counterclockwise and thus pull the accumulator shift plate 528 forwardly (to the left, Fig. 28) and swing the cam plate 530 clockwise to cause disengagement of the accumulator pinions 460 from their racks 514.

Operation

Since the operation of various detailed assemblies of the machine has been included in the description of these parts, it will be necessary here merely to summarize the overall operation of the machine and the functions performed thereby.

Assuming that the operation to be formed is that of the multiplication set forth in Fig. 1a, namely, 999,999 by 99,999, the operator will enter the latter factor in the multiplier keyboard 52 by five successive depressions of the "9" numeral key 60, thus indexing the pin carriage 84 to the left to its tens of thousands position setting up the "9" stops thereof. Then, by six successive depressions of the "9" numeral key 60 of the multiplier keyboard 54, the operator will enter the multiplicand, indexing the pin carriage 85 to the hundreds of thousands position.

The machine is then in condition for operation and the operator may press the motor bar 56. This causes the starting of the motor 770 and the engagement of the one revolution clutch mechanism shown in Figs. 30 and 32, whereupon the main shaft commences rotation.

Referring to Fig. 25, it will be noted that shortly after the commencement of the clockwise rotation of the main shaft 174 the bail rod 722 will be swung upwardly thereby permitting the springs 456 associated with the type carriers 332 for the multiplicand and multiplier to rise to raise these type carriers distances corresponding to the stops set in the pin carriages, in the present instance to the maximum extent, that is, to the "9" position, the motion of the type carriers being transmitted to the racks 110 and 114 through the pinions 693 and 702, respectively.

As the racks 110 and their connected racks 90 move rearwardly, they drive the shaft 102 to 106 clockwise (Fig. 5) through the torsion springs 112 through $\frac{9}{10}$ of a revolution (324°), thereby positioning the notched plate assemblies 120 mounted on these shafts to positions in which the zero stop faces of their "9" sections are in alignment with the feelers 130, 131. As soon as the racks 110, 114 have been fully actuated and have stopped movement, the sensing pins 142 are lowered to sense the positions of the racks 114, and the stop fingers 140 are simultaneously moved downwardly to positions corresponding to the stops which arrested their associated sensing pin 142. In the illustrative example, the stop fingers 140 will move downwardly one step. Following this, the shafts 102 to 106 are rotated through an additional 36° by the mechanism shown in Fig. 34, the rotation of the shafts, through the torsion springs 134, driving the notched plate assemblies 120 clockwise an additional distance until they are arrested by the depressed stop fingers 140 at the "9" stop faces of the "9" section.

Following this the bail 210 (Fig. 3) moves forwardly, thus permitting the feelers 130, 131 to move upwardly until arrested by the stop surfaces of the notched plates 123 and 124. In the given example all of the notched plate assemblies 120 will be in the same position relative to their feelers 130, 131 and in each instance, the feeler 130 will be permitted to move a distance of one step, abutting against the stop surface 1a (Fig. 7), whereas the feeler 131 will be permitted to move eight steps before it is arrested by the stop portion 8a (Fig. 7). The stop portions of the lower arms 224 of the links 206 will therefore be correspondingly positioned. At this point the plate cam 268 commences operation to cause the cam shaft 255 successively to rotate, in steps of one-sixth of a revolution, and through the cams 252 carried thereby, first lowering the links 206 which are associated with the feelers 131 which cooperate with all of the notched plates 124 mounted on the shaft 106. Each of these links 206 will, of course, have been set to the "8" position so that upon the immediately following forward movement of the stop links 336, the latter will move forwardly to the "8" position and swing their actuator segments 312 clockwise to the "8" position. Such of the links 206 which have not been lowered will, through the operation of their associated auxiliary stops 350, prevent movement of their associated stop links 336. Immediately thereafter the accumulator pinions 296 are brought into mesh with the actuator segments 312 and upon the return movement of the latter the accumulator pinions will be rotated clockwise to the "8" position.

The cam shaft 255 is then rotated through another sixth of a revolution elevating the previously depressed links 206 and lowering the links 206 which are associated with the feelers 130 which engage the plate 123 of the notched plate assemblies mounted on the shaft 106. Since, as previously noted, these feelers will be arrested by the stop surfaces 1a, the links 206 will be moved but one step to their "1" position. Then, as previously described, these "1's" will be added into the accumulator 296. This operation will be repeated five times through the rotation of the cam shaft 255, and during the last or sixth partial rotation of the shaft 255, the shaft 254 will be rotated. At each successive position of the shafts 255 and 254, a different set of links 206 will be moved to their lower position and have their settings entered into the accumulator 296, the order in which this takes place being indicated in the diagram Fig. 1a, the lowermost partial product being the first which is added into the accumulator 296.

After all of these sensing operations have been performed and the partial products added into the accumulator 296, the product accumulated in the accumulator 296 is transferred to the accumulator 460 and the accumulator 296 reset to zero position. This is accomplished as previously described by the mechanism most clearly shown in Fig. 23. When the type carriers 332, during the course of this total transferring operation, have moved to the positions in which they are limited by the zero stops on the transfer cams of the accumulator 296, the printing mechanism, best shown in Figs. 6 and 27, comes into operation to print the multiplier and the multiplicand, and the product derived from the accumulator 296.

Prior to the return (downward) strokes of the type carriers 332, the accumulator pinions 700, 704 and 460 are brought into mesh with their racks 514, and thus during the downward movement of the racks the amount of the multiplier, multiplicand, and product are entered into these accumulators, respectively. Toward the end of the cycle of operation, the pin carriages are restored by the mechanism best shown in Figs. 30, 31 and 33.

Any desired number of problems of multiplication may be successively performed by the machine in the manner just described, and as each product is obtained, it will be added into the accumulator 460 to provide a grand total of the products. Likewise the amounts of the multipliers and multiplicands will be added into the accumulators 700 and 704 to make available the grand totals thereof, should they be of any significance.

Having completed the desired multiplying operations, the total key 58 is depressed which, as previously described, disables the partial product totaling mechanism and shifts the engaging and disengaging mechanism for the accumulator 460 so as to cause the latter to engage during the upward movement of the type carriers 332. The type carriers are arrested by the engagement of the teeth 466 of the transfer cams with the ends of the then locked transfer pawls 472, so that the type carriers will be stopped in positions representing the grand total of the products. In a similar manner the type carriers for the multiplier and multiplicand will have their positions controlled by the accumulators 700 and 704 to print the total of the multipliers and the total of the multiplicands. The type hammers having been released, the printing on the record tape 66 of these grand totals is effected, the accumulators 460, 700, 704 are disengaged, and the type carriers 332 restored to normal position. It will be recalled that a suitable interlock is provided to prevent a grand total taking operation unless the stop pin carriages are in normal home position.

From the foregoing, it will appear that the multiplying machine of the invention operates very rapidly and effectively to perform multiplying operations and to provide a permanent record of the factors and products, as well as the grand totals thereof. The machine may therefore be conveniently used for computing extensions on invoices or checking such extensions, and for the performance of any other multiplying operations. It will be understood that while the machine is illustrated as of capacity capable of multiplication of a five digit figure by a six digit figure, the capacity may be extended if desired, such extension for each digit of the multiplier requiring the addition of notched plate assembly 120 to each of the shafts 102 to 106, an extension to increase the capacity of the multiplier, and the addition of a shaft, such as the shafts 102 to 106, together with a mechanism such as is associated with each of these shafts. In addition, of course, the number of links 206, the number of pinions in the accumulators, and the mechanism by which the amounts are entered in these accumulators, and the number of cams on the cam shafts 254 and 255, and the number of positions assumed thereby, will have to be correspondingly increased.

While we have shown and described a preferred embodiment of our invention, it will be apparent that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. In a calculating machine in which a plurality of stop elements are set up concurrently to represent each of the partial products of each digit of the multiplicant by each digit of the multiplier, the combination of a denominationally ordered accumulator, denominationally ordered actuators for the accumulator, means to cause repeated excursions of the actuators differential distances into engagement with the stop elements, means to engage the accumulator with the actuators while they move in one direction and to disengage it therefrom while they move in the opposite direction, means operable prior to each excursion of the actuators to move the stop elements sequentially in groups into effective positions to arrest the actuators, said means operating on the stop elements in groups with not more than one stop element of each denominational order in each group, means providing a zero stop for each actuator for engagement thereby when none of the stop elements of its denominational order is moved to effective position, and means to restore all of the stop elements to zero position after all of the partial products represented thereby have been added into the accumulator.

2. In a calculating machine, the combination of a plurality of shafts, a plurality of notched plate assemblies rotatably mounted on each of said shafts, resilient means to hold the assemblies in predetermined angular positions on their shafts each of said assemblies having stop faces representing respectively the products of "0" to "9" by "0" to "9," a pair of keyboards, means under the control of one of the keyboards to rotate said shafts respectively through angles representative of the digits of the factor set up in one of the keyboards, means under the control of each operated key of the other keyboard to set one assembly on each of said shafts to a position representing the products of each digit set up in the first keyboard by the digits of the operated keys of said other keyboard, said last named means operating by relative rotation of the assemblies and the shafts upon which they are mounted against the forces applied by said resilient means, means for sensing the partial products thus set up in said assemblies, and means for adding the partial products sensed.

3. In a calculating machine having differentially settable radially notched plate assemblies movable concurrently under the control of a pair of keyboards and having stop faces representing the products of the digits set up in said two keyboards each by each of the others, means for sensing the partial products set up in said assemblies comprising, a feeler for each notched plate of each of the assemblies, means operating concurrently resiliently to move all of said feelers radially inwardly of the notched plates to engage and have their movement limited by the stop faces of the notched plates, stop elements set in a position corresponding to the positions of the feelers respectively, an adding mechanism cooperable with said stop elements and effective to add the amounts represented by the positions of the stop elements, and means to render said stop elements successively effective to control the operation of said adding mechanism, said last named means comprising cams cooperable respectively with each of the stop elements and operable successively to move groups of stop elements to positions effective for the control of the adding mechanism, the stop elements of each group being of different denominational orders.

4. The combination set forth in claim 3, in which there is provided a grand total accumulator, and in which control means are provided to operate automatically near the end of each operating cycle of the machine to transfer to the grand total accumulator the products accumulated in said adding mechanism.

5. In a calculating machine of notched plate type having notched plates and means for setting the notched plates concurrently to positions respectively representing the products of each of a plurality of digits of a multiplier by each of a plurality of digits of a multiplicand, feelers operating concurrently for sensing the products thus represented, stop elements respectively positioned by said feelers to represent respectively each of the digits of each of the products, an adding mechanism cooperable with said stop elements, means normally holding said stop elements in ineffective position with respect to said adding mechanism, means successively to move groups of said stop elements to positions for effective cooperation with said adding mechanism, means to operate the adding mechanism to cause successive addition of the amounts represented by the stop elements moved to effective position, and means to move the stop elements to effective positions in groups, each group of stop elements containing not more than one stop element for each denominational order of the adding mechanism.

6. The combination set forth in claim 5, in which the means for moving said stop elements to effective position comprises a rotary cam shaft having a cam thereon for each of the stop elements.

7. The combination set forth in claim 5, in which the means for moving the stop elements to effective positions comprises a pair of shafts respectively carrying cams, one for each of the stop elements, each of the cams having six positions, in only one position of which the stop element is movable to effective position, means for successively advancing one cam shaft through steps of one-sixth of a revolution until it has completed one revolution, and means to advance the other cam shaft successively through steps of one-sixth of a revolution, the first step of movement of the second cam shaft taking place during the last step of movement of the first cam shaft.

8. The combination set forth in claim 7, in which the means for advancing the cam shafts comprises ratchet wheels respectively fixed to the cam shafts, a pair of pawls respectively cooperable with each of said ratchet wheels, and an actuating cam operably connected to the pawls to rotate the ratchet wheels through steps of one-sixth of a revolution.

9. In a multiplying machine, the combination of a plurality of parallel shafts, groups of notched plates mounted on each of the shafts, the notched plates on one shaft extending between the notched plates on adjacent shafts with the groups of notched plates in echelon the notches in said plates representing the partial products of multiplicands from zero to nine and multipliers from zero to nine, a pair of keyboards, means controlled by the amount set up in one keyboard to rotate the shafts respectively and the notched plates mounted thereon to positions representative of the digits of a first factor, means controlled by the second keyboard to rotate said notched plate assemblies on different shafts additional distances relative to their shafts representative respectively of the digits of a second factor set up in the second keyboard, means cooperable with the notched plates to sense the partial products represented by the positions thereof, and means to accumulate the partial products represented by the positions of said notched plate assemblies.

10. In a multiplying machine, the combination of a plurality of concurrently set notched plate assemblies, each of said assemblies including a notched plate representing the units of the partial products and a notched plate representing the tens of the partial products, each notched plate including ten groups of stop faces and each group having stop faces representative of the numerals from zero to nine, and a third plate having ten sets of stop faces, each set representing the numerals from zero to nine, means to set said notched plates in positions to represent a multiplier, means including the stop faces on the third plate to set the notched plates further to positions to represent the partial products of a multiplier and multiplicand, means to sense the partial products represented by the positions of said notched plates, and means to accumulate the partial products thus sensed, said accumulating means operating in sequence to accumulate the units values and then the tens values of a predetermined group of notched plates and thereafter in sequence to accumulate the units and then tens amounts from the remaining notched plates in predetermined groups.

11. In a multiplying machine, the combination of a plurality of shafts, a plurality of notched plate assemblies mounted on each of said shafts, each of said notched plate assemblies having one hundred operating positions and formed to have notches which by their radial depth represent the products of each of the factors zero to nine by each of the factors zero to nine respectively, a multiplier keyboard, means controlled thereby to rotate said shafts and the notched plate assemblies mounted thereon respectively to positions corresponding to the numerals constituting the multiplier, a multiplicand keyboard, means controlled thereby to rotate notched plate assemblies on different shafts additional distances respectively representing the numerals of the multiplicand, feelers cooperable with said notched plate assemblies to sense the partial products represented by the positions of the assemblies, each of said notched plate assemblies comprising a notched plate representing the units of the partial product and a notched plate representing the tens of the partial product, and means for successively accumulating the partial products represented by the positions of the feelers.

12. In a multiplying machine, the combination of a pair of keyboards for entry of two factors to be multiplied, a plurality of notched plate assemblies, each assembly having one hundred effective positions representing respectively the products of the multiplication of each of the digits zero to nine by each of the digits zero to nine, means under the control of one of said keyboards concurrently to position a plurality of said notched plate assemblies to represent respectively the partial products of the numerals of the multiplier by the factor zero, and means controlled by said second keyboard for positioning said notched plate assemblies respectively to represent the partial products of the digits of the multiplicand and multiplier, means for sensing the partial products represented by the positions of the notched plate assemblies, stops positioned by the sensing means to represent the partial products, an accumulator, actuators for the accumulator, means normally holding the stops out of the paths of the actuators and operable successively to move groups of the stops into the paths of the actuators, each group of stops including not more than one stop for each actuator, and means to operate said last named means and said actuators in timed relation.

13. In a calculating machine, the combination of a plurality of devices each having stop faces representing the products of zero to nine by zero to nine respectively, means to set said devices in positions to represent the partial products occurring in the multiplication of two given numbers, a plurality of stop elements, means to sense the positions of said devices and to move the stop elements to positions representing all of the digits of all of the partial products, said stop elements being grouped in accordance with their denominational orders, an accumulator, actuators for the accumulator, means operating repeatedly during a single machine cycle to move said actuators toward said stop elements to be differentially stopped thereby, and means to hold said stop elements out of the paths of movement of the actuators and to move them into such paths successively in predetermined groups, each group including only one stop element of any denominational order, whereby the partial products determined by the setting of said devices are transferred to the accumulator.

14. In a calculating machine, a plurality of notched plate assemblies, means to selectively set said assemblies concurrently to represent all of the partial products of two multi-digit factors, a plurality of feelers cooperable with the notched plates respectively to sense the setting of all of them concurrently, stop means respectively set by the feelers, an accumulator, actuating means for the accumulator, and means to cause the actuators to limit against the stop means in a predetermined sequence and to effect the addition into the accumulator of the amounts represented by the setting of the stop means.

15. In a multipling machine, the combination of a plurality of differentially positioned elements, each having a plurality of stepped stop faces, a plurality of notched plates having stop faces representing partial products, a plurality of sensing pins cooperable with the stop faces of said elements to sense the position of the latter, a plurality of stop fingers differentially positioned by said sensing pins, and means carried by said notched plates to move the notched plates to positions determined by the stop fingers.

16. In a multiplying machine, the combination of a plurality of shafts, one for each denominational order of the multiplier, a plurality of notched plate assemblies mounted for rotation on each of said shafts, a resilient driving connection between each of the assemblies and the shaft on which it is mounted, cooperating stop means on each of the assemblies and its associated shaft to limit the extent of movement of the assemblies with respect to their shafts, a multiplier keyboard, a multiplicand keyboard, means controlled by the multiplier keyboard substantially simultaneously to rotate the shafts differentially through angular distances corresponding respectively to the digits set up in such keyboard, and means under the control of the multiplicand keyboard to rotate one of said assemblies on each of said shafts relative thereto through the resilient driving connections angular distances corresponding to the digits set up in the latter keyboard.

17. In a multiplying machine, the combination of a plurality of notched plate assemblies, each assembly having one hundred pairs of stop faces, said assemblies being arranged in rows and files, a pair of keyboards, means under control of one of the keyboards to move the assemblies of different rows to positions corresponding respectively with the digits set up in such keyboard, stop fingers cooperable with the assemblies respectively and positioned under the control of the other keyboard to represent the amount set up therein, means including a resilient drive to rotate the assemblies differentially to be arrested by the stop fingers, and means to sense and accumulate the partial products represented by the positions of the assemblies.

18. In a calculating machine in which a plurality of stop elements are set up to represent each of the partial products of each digit of the multiplicand by each digit of the multiplier, the combination of a partial product accumulator, actuators for the accumulator, means to cause repeated excursions of the actuators differential distances into engagement with the stop elements, means to engage the accumulator with the actuators while they move in one direction and to disengage it therefrom while they move in the opposite direction, means including a cam for each stop element operated prior to each excursion of the actuators to move the stop elements sequentially in groups into effective positions to arrest the actuators, said means operating on the stop elements in groups with not more than one stop element of each denominational order in each group, zero stops for engagement by the actuators respectively when none of the stop elements of a denominational order corresponding to that of the actuator is positioned to represent a significant digit, a grand total accumulator, printing mechanism, a product control key, and means operated automatically after all of the partial products represented thereby have been added into the partial product accumulator, to restore all of the stop elements to zero position, to effect clearing of the partial product accumulator, to effect transfer of the product therein to the grand total accumulator, and to effect printing of the product by the printing mechanism.

19. In a calculating machine, the combination of a plurality of shafts, a plurality of notched plate assemblies on each of said shafts, each of said assemblies having stop faces formed at the ends of radial notches arranged in ten groups to represent respectively the products of "0" to "9" by "0" to "9" and including a notched positioning plate having ten similar groups of notches, each of the latter group including stop faces in succession representing the numerals "0" to "9", a pair of keyboards, means including an individual spring drive for each shaft operating under the control of one of the keyboards to rotate said shafts respectively through angles representative of the digits of the factor set up in one of the keyboards, means including said positioning plate under the control of each operated key of the other keyboard to set one assembly on each of said shafts to a position at which the stop faces represent the products of each digit set up in the first keyboard by the digit of the operated key of said other keyboard, and means for sensing and adding the partial products thus set up in said assemblies.

20. A notched plate assembly and positioning means therefore for a multiplying machine comprising, a shaft, a limit stop element secured to the shaft, three plates secured together and pivotally mounted on the shaft, one of the plates having peripheral radial notches of depths representing the tens digits and another plate having peripheral radial notches of depth representing the units digits of the partial products of each digit "0" to "9" by each digit "0" to "9", the third plate having ten sets of peripheral notches each providing ten radial stepped stop faces representative of the digits, "0" to "9" differential radially movable stop fingers for cooperation with the radial stop faces, a second limit stop element rigid with said plates, a spring tensioned between the shaft and the plates normally holding the limit stop elements in engagement with each other and yieldable sufficiently to permit rotary movement of the plates relative to the shaft an arcuate distance of approximately one-tenth of a revolution, means to rotate the shaft and the three plates mounted thereon through an angle representative of one factor, and means cooperating with the stepped stop faces on the third plate for moving the plates relative to the shaft additional distances corresponding to the second factor in opposition to the force applied by the spring.

21. In a multiplying machine, the combination of a plurality of shafts, one for each denominational order of the multiplier, a plurality of notched plate assemblies mounted for rotation on each of said shafts, a resilient driving connection between each of the assemblies and the shaft upon which it is mounted, cooperating stop means on each of said assemblies and its associated shaft to limit the extent of movement of the assemblies with respect to their shafts under the influence of the resilient driving connections, a multiplier keyboard, a multiplicand keyboard, means controlled by the multiplier keyboard substantially simultaneously to rotate the shafts differentially through angular distances corresponding respectively to the digits set up in the multiplier keyboard, and means under the control of the multiplicand keyboard to rotate one of said assemblies on each of said shafts through the resilient driving connections angular distances corresponding respectively to each digit of the amount set up in the multiplicand keyboard.

22. In a multiplying machine, the combination of a multiplier keyboard, a multiplicand keyboard, parallel multiplier and multiplicand racks controlled by the keyboards respectively to move differential unit distances determined by the amounts set up in the keyboards, a plurality of shafts extending transversely of the racks, a plurality of notched plate assemblies mounted on said shaft each having ten groups of radial notches representing in succession the products of the numerals zero to nine respectively multiplied by zero to nine, a spring connected between each assembly and its shaft, stop means to prevent relative rotation of the assembly and shaft in one direction only, yielding driving connections between the multiplier racks and shafts respectively to rotate the shafts through angles of approximately 36 degrees for each unit of movement of its associated multiplier rack, a plurality of groups of similar stepped stop parts on each of the multiplicand racks, stop fingers positioned by the stepped stop parts and cooperating with the notched plate assemblies to arrest the assemblies on each shaft in positions related to the unit distances through which the multiplicand racks have been moved, and means to rotate all of the shafts through an angle greater than 36 degrees.

23. In a multiplying machine of the type in which notched parts are set concurrently to represent the partial products of a multi-digit multiplicand and a multi-digit multiplier; the combination of a plurality of sensing fingers, one for each notched part; yieldable means operated simultaneously to move the fingers into sensing engagement with the notched parts respectively; a stop element connected to and movable with each of the sensing fingers; means normally holding the stop elements in ineffective position; cyclically operating means to move groups of said stop elements to effective position in succession, there being not more than one stop element for each denominational order in each group; and accumulating means operating in timed relation with the cyclically operating means and controlled by the groups of stop elements, when they are in effective positions, to add the partial products represented thereby.

MARION W. GRIGSBY.
THOMAS O. MEHAN.

REFERENCES CITED

The following references are of record in the file of this patent:

UNITED STATES PATENTS

| Number | Name | Date |
|---|---|---|
| Re. 22,947 | Clary et al. | Dec. 9, 1947 |
| 775,939 | Saunders | Nov. 29, 1904 |
| 1,140,684 | Jones | May 25, 1915 |
| 1,289,610 | Beard | Dec. 31, 1918 |
| 1,838,647 | Watters et al. | Dec. 29, 1931 |
| 1,886,148 | Baumann et al. | Nov. 1, 1932 |
| 1,958,515 | Isherwood | May 15, 1934 |
| 2,084,831 | Baumann et al. | June 22, 1937 |
| 2,113,352 | McClure | Apr. 5, 1938 |
| 2,182,001 | Peirce | Dec. 5, 1939 |
| 2,296,276 | Gollwitzer | Sept. 22, 1942 |
| 2,342,529 | Chase | Feb. 22, 1944 |
| 2,515,692 | Boyden et al. | July 18, 1950 |